United States Patent
Sjöstrand

(10) Patent No.: US 11,948,283 B2
(45) Date of Patent: Apr. 2, 2024

(54) SYSTEMS AND METHODS FOR INTERACTIVE ADJUSTMENT OF INTENSITY WINDOWING IN NUCLEAR MEDICINE IMAGES

(71) Applicant: Progenics Pharmaceuticals, Inc., North Billerica, MA (US)

(72) Inventor: Karl Vilhelm Sjöstrand, New York, NY (US)

(73) Assignee: Progenics Pharmaceuticals, Inc., N. Billerica, MA (US)

( * ) Notice: Subject to any disclaimer, the term of this patent is extended or adjusted under 35 U.S.C. 154(b) by 346 days.

(21) Appl. No.: 17/604,613

(22) PCT Filed: Apr. 23, 2020

(86) PCT No.: PCT/US2020/029434
§ 371 (c)(1),
(2) Date: Oct. 18, 2021

(87) PCT Pub. No.: WO2020/219619
PCT Pub. Date: Oct. 29, 2020

(65) Prior Publication Data
US 2022/0180487 A1      Jun. 9, 2022

Related U.S. Application Data

(60) Provisional application No. 62/837,925, filed on Apr. 24, 2019.

(51) Int. Cl.
*G06T 5/00* (2006.01)
*G06T 7/00* (2017.01)

(52) U.S. Cl.
CPC ............ *G06T 5/009* (2013.01); *G06T 7/0012* (2013.01); *G06T 2207/10104* (2013.01);
(Continued)

(58) Field of Classification Search
CPC .............. G06T 5/009; G06T 7/0012; G06T 2207/10104; G06T 2207/10108;
(Continued)

(56) References Cited

U.S. PATENT DOCUMENTS 7,450,747 B2    11/2008  Jabri et al.
7,751,605 B2     7/2010  Gündel et al.
(Continued)

FOREIGN PATENT DOCUMENTS

CN    101528267 A    9/2009
CN    102361594 A    2/2012
(Continued)

OTHER PUBLICATIONS

Ali, A. et al., The Automated Bone Scan Index as a Predictor of Response to Prostate Radiotherapy in Men with Newly Diagnosed Metastatic Prostate Cancer: An Exploratory Analysis of STAMPEDE's "M1 |RT Comparison", European Urology Oncology 3:412-419, (2020).
(Continued)

*Primary Examiner* — Diane D Mizrahi
(74) *Attorney, Agent, or Firm* — Choate, Hall & Stewart LLP; William R. Haulbrook; Ronen Adato

(57) ABSTRACT

Presented herein are systems and methods that provide for improved computer aided display and analysis of nuclear medicine images. In particular, the systems and methods described herein offer improved interactive adjustment of intensity windowing for display of nuclear medicine images. The interactive intensity window selection tools described herein utilize a nonlinear scaling function that maps user adjustments to positions of displayed indicator widgets on a scale to intensity window thresholds. The form of the scaling function increasingly magnifies user adjustments at the upper range of the scale, but remains linear at the lower end.

(Continued)

The intensity windowing tools presented herein allow the user to adjust intensity thresholds over a full range of intensities encountered in an image, up to the maximum value, while still preserving fidelity in an important range that includes lower intensities.

24 Claims, 19 Drawing Sheets

(52) U.S. Cl.
CPC .............. *G06T 2207/10108* (2013.01); *G06T 2207/20092* (2013.01); *G06T 2207/20208* (2013.01); *G06T 2207/30008* (2013.01)

(58) Field of Classification Search
CPC . G06T 2207/20092; G06T 2207/20208; G06T 2207/30008
See application file for complete search history.

(56) References Cited

U.S. PATENT DOCUMENTS

| | | | |
|---|---|---|---|
| 7,935,055 B2 | 5/2011 | Burckhardt | |
| 8,199,985 B2 | 6/2012 | Jakobsson et al. | |
| 8,211,401 B2 | 7/2012 | Babich et al. | |
| 8,467,856 B2 | 6/2013 | Renisch et al. | |
| 8,538,166 B2 | 9/2013 | Gordon et al. | |
| 8,778,305 B2 | 7/2014 | Pomper et al. | |
| 8,855,387 B2 | 10/2014 | Hamadeh et al. | |
| 8,962,799 B2 | 2/2015 | Babich et al. | |
| 9,002,081 B2 | 4/2015 | Brown | |
| 9,721,340 B2 | 8/2017 | Gillies et al. | |
| 10,223,610 B1 | 3/2019 | Akselrod-Ballin et al. | |
| 10,311,971 B2 | 6/2019 | Opfer et al. | |
| 10,339,653 B2 | 7/2019 | Gillies et al. | |
| 10,340,044 B2 | 7/2019 | Yao et al. | |
| 10,340,046 B2 | 7/2019 | Baker | |
| RE47,609 E | 9/2019 | Hamadeh et al. | |
| 10,600,184 B2 | 3/2020 | Golden et al. | |
| 10,665,346 B2 | 5/2020 | Baker | |
| 10,748,652 B2 | 8/2020 | Yao et al. | |
| 10,762,993 B2 | 9/2020 | Baker | |
| 10,818,386 B2 | 10/2020 | Yao et al. | |
| 10,867,697 B2 | 12/2020 | Lyman et al. | |
| 10,869,608 B2 | 12/2020 | Dormer et al. | |
| 10,916,337 B2 | 2/2021 | Poblenz et al. | |
| 10,943,681 B2 | 3/2021 | Yao et al. | |
| 10,973,486 B2 | 4/2021 | Sjostrand et al. | |
| 11,011,257 B2 | 5/2021 | Lints et al. | |
| 2003/0215120 A1 | 11/2003 | Uppaluri et al. | |
| 2006/0062425 A1 | 3/2006 | Shen et al. | |
| 2007/0081712 A1 | 4/2007 | Huang et al. | |
| 2007/0081713 A1 | 4/2007 | Jerebko | |
| 2010/0215581 A1 | 8/2010 | Hoffmann | |
| 2011/0255763 A1 | 10/2011 | Bogoni et al. | |
| 2012/0123253 A1 | 5/2012 | Renisch et al. | |
| 2012/0218290 A1 | 8/2012 | Waschbuesch et al. | |
| 2013/0038707 A1 | 2/2013 | Cunningham et al. | |
| 2013/0129168 A1 | 5/2013 | Ross | |
| 2015/0110716 A1 | 4/2015 | Armor | |
| 2015/0331995 A1 | 11/2015 | Zhao et al. | |
| 2016/0203263 A1 | 7/2016 | Maier et al. | |
| 2016/0335395 A1 | 11/2016 | Wu et al. | |
| 2017/0083682 A1 | 3/2017 | McNutt et al. | |
| 2017/0086768 A1 | 3/2017 | Hefetz et al. | |
| 2018/0144828 A1 | 5/2018 | Baker | |
| 2018/0259608 A1 | 9/2018 | Golden et al. | |
| 2019/0073755 A1 | 3/2019 | Ito et al. | |
| 2019/0105009 A1 | 4/2019 | Siemionow et al. | |
| 2019/0209116 A1 | 7/2019 | Sjostrand et al. | |
| 2019/0388049 A1 | 12/2019 | Gupta et al. | |
| 2020/0027559 A1 | 1/2020 | Baker | |
| 2020/0074634 A1 | 3/2020 | Kecskemethy et al. | |
| 2020/0085382 A1 | 3/2020 | Taerum et al. | |
| 2020/0126666 A1 | 4/2020 | Baker | |
| 2020/0160976 A1 | 5/2020 | Lyman et al. | |
| 2020/0193594 A1 | 6/2020 | Georgescu et al. | |
| 2020/0193603 A1 | 6/2020 | Golden et al. | |
| 2020/0245960 A1 | 8/2020 | Richter et al. | |
| 2020/0337658 A1* | 10/2020 | Sjöstrand | A61B 6/037 |
| 2020/0342600 A1 | 10/2020 | Sjostrand et al. | |
| 2020/0357118 A1 | 11/2020 | Yao et al. | |
| 2020/0357521 A1 | 11/2020 | Baker | |
| 2021/0012883 A1 | 1/2021 | Bidulock et al. | |
| 2021/0082547 A1 | 3/2021 | Yao et al. | |
| 2021/0093249 A1 | 4/2021 | Anand et al. | |
| 2021/0183485 A1 | 6/2021 | Yao et al. | |
| 2021/0233633 A1 | 7/2021 | Lints et al. | |
| 2021/0334974 A1 | 10/2021 | Johnsson et al. | |
| 2021/0335480 A1 | 10/2021 | Johnsson et al. | |
| 2022/0005586 A1 | 1/2022 | Brynolfsson et al. | |

FOREIGN PATENT DOCUMENTS

| | | |
|---|---|---|
| EP | 1426903 A2 | 6/2004 |
| EP | 3043318 A1 | 7/2016 |
| JP | 6013042 B2 | 10/2016 |
| JP | 6170284 B2 | 7/2017 |
| SE | 524500 C2 | 8/2004 |
| WO | WO-99/05503 A2 | 2/1999 |
| WO | WO-2007/062135 A2 | 5/2007 |
| WO | WO-2009/084995 A1 | 7/2009 |
| WO | WO-2011/077303 A1 | 6/2011 |
| WO | WO-2015/058151 A2 | 4/2015 |
| WO | WO-2018/081354 A1 | 5/2018 |
| WO | WO-2019/103912 A2 | 5/2019 |
| WO | WO-2019/136349 A2 | 7/2019 |
| WO | WO-2020/144134 A1 | 7/2020 |
| WO | WO-2020/190821 A1 | 9/2020 |
| WO | WO-2020/219619 A1 | 10/2020 |
| WO | WO-2020/219620 A1 | 10/2020 |
| WO | WO-2021/061315 A1 | 4/2021 |
| WO | WO-2022/008374 A1 | 1/2022 |

OTHER PUBLICATIONS

American College of Radiology (ACR) and the Society for Pediatric Radiology (SPR), ACR-SPR Practice Parameter For The Performance Of Skeletal Scintigraphy (Bone Scan), Resolution 28, (2013-Revused2017), available from: <http://www.acr.org>, 9 pages (2017).

Anand, A. et al., A Pre-Analytical Validation Study of Automated Bone Scan Index: Effect on Accuracy and Reproducibility Due to the Procedural Variabilities in Bone Scan Image Acquisition. J Nucl Med. pp. 1865-1871, (2016).

Anand, A. et al., Analytic Validation of the Automated Bone Scan Index as an Imaging Biomarker to Standardize Quantitative Changes in Bone Scans of Patients with Metastatic Prostate Cancer, J. Nucl. Med., 57(1):41-45 (2016).

Anand, A. et al., Automated Bone Scan Index as a quantitative imaging biomarker in metastatic castration-resistant prostate cancer patients being treated with enzalutamide, EJNMMI Research, 6:23, 7 pages (2016).

Anand, A. et al., Translating Prostate Cancer Working Group 2 (PCWG2) Progression Criteria into a Quantitative Response Biomarker in Metastatic Castration Resistant Prostate Cancer (mCRPC), ASCO GU Conference, Poster, 1 page, presented Feb. 16, 2017.

Anand, A. et al., Translating Prostate Cancer Working Group 2 (PCWG2) progression criteria into a quantitative response biomarker in metastatic castration-resistant prostate cancer (mCRPC), Journal of Clinical Oncology, 35(6):170 (2017).

Armstrong, A. et al., Assessment of the bone scan index in a randomized placebo-controlled trial of tasquinimod in men with metastatic castration-resistant prostate cancer (mCRPC), Urologic Oncology: Seminars and Original Investigations, 32:1308-1316 (2014).

Armstrong, A. et al., Development and validation of a prognostic model for overall survival in chemotherapy-naive men with metastatic castration-resistant prostate cancer (mCRPC) from the phase

(56) References Cited

OTHER PUBLICATIONS 3 prevail clinical trial, Journal of Clinical Oncology, 35(Suppl. 6):Abstract 138, 5 pages, (2017).
Armstrong, A. J. et al., Phase 3 Assessment of the Automated Bone Scan Index as a Prognostic Imaging Biomarker of Overall Survival in Men with Metastatic Castration-Resistant Prostate Cancer: A Secondary Analysis of a Randomized Clinical Trial. JAMA Oncology 4:944-951, (2018).
Armstrong, A. J. et al., Phase 3 prognostic analysis of the automated bone scan index (aBSI) in men with bone-metastatic castration-resistant prostate cancer (CRPC), Meeting Library ASC University, 11 pages (2017).
Belal, S. et al., Association of PET Index quantifying skeletal uptake in NaF PET/CT images with overall survival in prostate cancer patients, ASCO GU 2017, Poster 178, 1 page, presented Feb. 16, 2017.
Belal, S. et al., PET Index quantifying skeletal uptake in NaF PET/CT images with overall survival in prostate cancer patients, ASCO GU 2017, Abstract, 1 page, (Feb. 13, 2017).
Belal, S. L. et al., 3D skeletal uptake of 18F sodium fluoride in PET/CT images is associate with overall survival in patients with prostate cancer, EJNMMI Research, 7(15): 1-8 (2017).
Belal, S.L. et al., Automated evaluation of normal uptake in different skeletal parts in 18F-sodium fluoride (NaF) PET/CT using a new convolutional neural network method, EJNMMI, EANM '17, 44(Suppl 2):S119-S956, Abstract EP-0116 (2017).
Bombardieri, E. et al., Bone scintigraphy: procedure guidelines for tumour imaging, Eur J. Nucl. Med. Mol. Imaging, 30:BP99-BP106, (2003).
Brynolfsson, J., et al., Deep Learning based urinary bladder segmentation using 18FDCFPyL (PyL-PSMA) PET/CT images, EPS-145, European Association of Nuclear Medicine, (2020), <http://link.springer.com/article/10.1007/s00259-020-04988-4>. pp. S1 and S403-404, Retrieved Sep. 18, 2020.
Brynolfsson, J., et al., Deep Learning-Enabled comprehensive detection and quantification of 18FDCFPyL (PyL-PSMA) PET/CT, OP-548, European Association of Nuclear Medicine, (2020), <http://link.springer.com/article/10.1007/s00259-020-04988-4>. pp. S1 and S273, Retrieved Sep. 18, 2020.
Bushberg, J. T. et al., Essential Physics of Medical Imaging, Essential Physics of Medical Imaging, 19.3: p. 581 (table 15-3), p. 713 paragraph 6, section 19.3 and p. 720, (2011).
Dennis, E. et al., Bone Scan Index: A Quantitative Treatment Response Biomarker for Castration-Resistant Metastatic Prostate Cancer, Journal of Clinical Oncology, 30(5):519-524 (2012).
Eiber, M. et al., Prostate Cancer Molecular Imaging Standardized Evaluation (PROMISE): Proposed miTNM Classification for the Interpretation of PSMA-Ligand PET/CT, The Journal of Nuclear Medicine, 59(3):469-478, (2018).
Giesel, F. L. et al., F-18 labelled PSMA-1007: biodistribution, radiation dosimetry and histopathological validation of tumor lesions in prostate cancer patients, Eur. J. Nucl. Med. Mol. Imaging, 44:678-688 (2017).
Gjertsson, K., et al., A Novel Automated Deep Learning Algorithm for Segmentation of the Skeleton in Low-Dose CT for [(18)F] DCFPyL PET/CT Hybrid Imaging in Patients with Metastatic Prostate Cancer, Annual Congress of the European Association of Nuclear Medicine Oct. 12-16, 2019 Barcelona, Spain. Eur J Nucl Med Mol Imaging 46 (Suppl 1), S1-S952 (2019). Abstract EP-0823, p. S765.
Gjertsson, K., Segmentation in Skeletal Scintigraphy Images using Convolutional Neural Networks, Master's Theses in Mathematical Sciences, pp. 39-58, (2017), <https://lup.lub.lu.se/student-papers/search/publication/8916406>.
Goffin, K. E. et al., Phase 2 study of $^{99m}$Tc-trofolastat SPECT/CT to identify and localize prostate cancer in intermediate- and high-risk patients undergoing radical prostatectomy and extended pelvic lymph node dissection, J. Nucl. Med., 27 pages (2017).

Hajnal, J. et al., 4.4 Intensity, Size, and Skew Correction; 7.1 Introduction; 7.2 Methods; 7.3 Image Interpretation—General, In: Medical Image Registration, CRC Press LLC, 80-81:144-148 (2001).
Hiller, S. M. et al., 99mTc-Labeled Small-Molecule Inhibitors of Prostate-Specific Membrane Antigen for Molecular Imaging of Prostate Cancer, Journal of Nuclear Medicine, 54(8):1369-1376 (2013) retrieved Oct. 25, 2017: <http://jnm.snmjournals.org/content/54/8/1369.full>.
Horikoshi, H. et al., Computer-aided diagnosis system for bone scintigrams from Japanese patients: importance of training database, Annals of Nuclear Medicine, 26(8):622-626 (2012).
Huang, J.-H. et al., A Set of Image Processing Algorithms for Computer-Aided Diagnosis in Nuclear Medicine Whole Body Bone Scan Images, IEEE Transactions on Nuclear Science, 54(3):514-522 (2007).
International Search Report for PCT/US2020/029434 filed Apr. 23, 2020, 5 pages, (dated Aug. 18, 2020).
Johnsson, K. et al., Analytical performance of aPROMISE: automated anatomic contextualization, detection, and quantification of [18F]DCFPyL (PSMA) imaging for standardized reporting, European Journal of Nuclear Medicin and Molecular Imaging, 11 pages, Aug. 31, 2021, doi: 10.1007/s00259-021-05497-8. Epub ahead of print. PMID: 34463809.
Johnsson, K., et al., miPSMA Index: Comprehensive and Automated Quantification of 18F-DCFPyL (PyL-PSMA) PET/CT for Prostate Cancer Staging, J Nucl Med., 61: (Supplement 1): 1435, 5 pages, (2020).
Kaboteh R. et al., Progression of bone metastases in patients with prostate cancer—automated detection of new lesions and calculation of bone scan index, EJNMMI Research, 3:64, 6 pages, (2013).
Kiess, et al., Prostate-specific membrane antigen and a target for cancer imaging and therapy, The Quarterly Journal of Nuclear Medicine and Molecular Imaging, 59(3):241-268 (2015).
Kikuchi, A. et al., Automated segmentation of the skeleton in whole-body bone scans: influence of difference in atlas, Nuclear Medicine Communications, 33(9):947-953 (2012).
Knutsson, H., and Andersson, M., Morphons: Segmentation using Elastic Canvas and Paint on Priors, IEEE International Conference on Image Processing (ICIP 2005), Genova, Italy, 4 pages (2005).
Kopka, K. et al., Glu-Ureido-Based Inhibitors of Prostate-Specific Membrane Antigen: Lessons Learned During the Development of a Novel Class of Low-Molecular-Weight Theranostic Radiotracers, The Journal of Nuclear Medicine, 58(9)(Suppl. 2):17S-26S, (2017).
Litjens, G. et al., A survey on deep learning in medical image analysis, Medical Image Analysis, 42:60-88, (2017).
Liu, L. et al., Computer-Aided Detection of Prostate Cancer with MRI: Technology and Applications, Acad Radiol. Author manuscript, 50 pages 2016.
Ma, L. et al., Automatic segmentation of the prostate on CT images using deep learning and multi-atlas fusion, Proc. of SPIE vol. 10133:1013320-1-1013320-9 (2017).
Ma, L. et al., Combining Population and Patient-Specific Characteristics for Prostate Segmentation on 3D CT Images, Proc of SPIE 9784:978427-1-8 (2016).
Ma, L. et al., Random Walk Based Segmentation for the Prostate on 3D Transrectal Ultrasound Images, Proc SPIE Int Soc Opt Eng. Author manuscript, 13 pages (2016).
Matsubara, N. et al., A Phase II, Randomized, Open-Label, Multi-arm Study of TAS-115 for Castration-Resistant Prostate Cancer Patients With Bone Metastases, Clinical Genitourinary Cancer, 000(xxx):1-10, (2021).
Nakajima, K. et al., Enhanced diagnostic accuracy for quantitative bone scan using an artificial neural network system: a Japanese multi-center database project, EJNMMI Research, 3:83, 9 pages, (2013).
Nickols, N. et al., aPROMISE: A Novel Automated-PROMISE platform to Standardize Evaluation of Tumor Burden in 18F-DCFPyL (PSMA) images of Veterans with Prostate Cancer, Journal of Nuclear Medicine, 26 pages, May 28, 2021, doi: 10.2967/jnumed. 120.261863.

(56) References Cited

OTHER PUBLICATIONS

Nickols, N.G., et al., A deep learning algorithm to predict coexisting metastatic disease using intraprostatic [F18]DCFPYL PSMA image alone in veterans with prostate cancer, Journal of Clinical Oncology 38, (Supplement 6), 2020.

Ohlsson, M., et al., Automated decision support for bone scintigraphy, Computer-based medical systems, pp. 1-6, (2009).

Pouliot, F., et al., Prospective evaluation of a Novel Deep Learning Algorithm (PSMA-AI) in the assessment of 99mTc-MIP-1404 SPECT/CT in patients with low or intermediate risk prostate cancer, Annual Congress of the European Association of Nuclear Medicine Oct. 12-16, 2019 Barcelona, Spain. Eur J Nucl Med Mol Imaging 46 (Suppl 1), S1-S952 (2019). Abstract EP-0804, p. S765.

Rowe, S. P. et al., PET Imaging of prostate-specific membrane antigen in prostate cancer: current state of the art and future challenges, Prostate Cancer and Prostatic Diseases, pp. 1-8 (2016).

Rowe, S. P. et al., PSMA-Based [18F]DCFPyL PET/CT Is Superior to Conventional Imaging for Lesion Detection in Patients with Metastatic Prostate Cancer, Mol Imaging Biol, 18:411-419, (2016).

Sabbatini, P. et al., Prognostic Significance of Extent of Disease in Bone in Patients With Androgen-Independent Prostate Cancer, Journal of Clinical Oncology, 17(3):948-957 (1999).

Sadik, M. et al., A new computer-based decision-support system for the interpretation of bone scans, Nuclear Medicine Communications, 27(5):417-423 (2006).

Sadik, M. et al., Computer-assisted interpretation of planar whole-body bone scans, Journal Nuclear Medicine, 49(12):1958-65, 2008.

Sadik, M. et al., Improved classifications of planar whole-body bone scans using a computer-assisted diagnosis system: a multicenter, multiple-reader, multiple-case study, Journal of Nuclear Medicine, 50(3): 368-75, 2009.

Sajn, L. et al., Computerized segmentation of whole-body bone scintigrams and its use in automated diagnostics, Computer Methods and Programs in Biomedicine, 80:47-55 (2005).

Santos-Cuevas, C. et al. 99mTc-labeled PSMA inhibitor: Biokinetics and radiation dosimetry in healthy subjects and imaging of prostate cancer tumors in patients, Nuclear Medicine and Biology 52:1-6, (2017).

Sjöstrand K. et al., Statistical regularization of deformation fields for atlas-based segmentation of bone scintigraphy images, MICCAI 5761:664-671 (2009).

Sjöstrand, K., et al., Automated detection and quantification of Prostatic PSMA uptake in SPECT/CT using a Deep Learning Algorithm for Segmentation of Pelvic Anatomy, The Journal of Nuclear Medicine, 59(1):p. 30, (2018).

Sjostrand, K., et al., Automated Assessment of Prostatic PSMA Expression in SPECT/CT using Deep Convolutional Neural Networks—A Prospectively Planned Retrospective Analysis of Phase 3 Study MIP-1404-3301, The Journal of Nuclear Medicine, 60 (Supplement 1): Abstract 401, 1 page, (2019).

Tian, Z. et al., A fully automatic multi-atlas based segmentation method for prostate MR images, Proc SPIE Int Soc Opt Eng. Author manuscript, 12 pages (2015).

Tian, Z. et al., A supervoxel-based segmentation method for prostate MR images, Med. Phys., 44(2):558-569 (2017).

Tian, Z. et al., Deep convolutional neural network for prostate MR segmentation, Proc. of SPIE 10135:101351L-1-101351L-6 12 pages, (2017).

Tian, Z., et al., Superpixel-based Segmentation for 3D Prostate MR Images, IEEE Trans Med Imaging, Author manuscript, pp. 558-569, (2016).

Trägårdh, E., et al., RECOMIA—a cloud-based platform for artificial intelligence research in nuclear medicine and radiology, EJNMMI Physics, <https://doi.org/10.1186/s40658-020-00316-9>, 7:51, 12 pages, (2020).

Ulmert, D. et al., A Novel Automated Platform for Quantifying the Extent of Skeletal Tumour Involvement in Prostate Cancer Patients Using the Bone Scan Index, European Urology, 62(1):78-84 (2012).

Wallis, J.W. et al., Three-dimensional display in nuclear medicine, IEEE Trans Med Imaging, 8(4):297-303, (1989).

Written Opinion for PCT/US2020/029434 filed Apr. 23, 2020, 6 pages, (dated Aug. 18, 2020).

Yin, T.-K., and Chiu, N.T., A Computer-Aided Diagnosis for Locating Abnormalities in Bone Scintigraphy by a Fuzzy System With a Three-Step Minimization Approach, IEEE Transactions on Medical Imaging, 23(5):639-654 (2004).

\* cited by examiner

FIG. 8C

SYSTEMS AND METHODS FOR INTERACTIVE ADJUSTMENT OF INTENSITY WINDOWING IN NUCLEAR MEDICINE IMAGES

CROSS REFERENCE TO RELATED APPLICATIONS

This application is a national stage application, filed under 35 U.S.C. § 371, of International Patent Application No. PCT/US20/029434, filed Apr. 23, 2020, which claims priority to and benefit of U.S. Provisional Application 62/837,925, filed Apr. 24, 2019, the contents of which are hereby incorporated by reference in its-their entirety.

TECHNICAL FIELD

This invention relates generally to systems and methods for creation, analysis, and/or presentation of medical image data. More particularly, in certain embodiments, the invention relates to systems and methods for improved computer-aided display and analysis of nuclear medicine images

BACKGROUND

Nuclear medicine imaging involves the use of radiolabeled compounds, referred to as radiopharmaceuticals. Radiopharmaceuticals are administered to patients and accumulate in various regions in the body in manner that depends on, and is therefore indicative of, biophysical and/or biochemical properties of tissue therein, such as those influenced by presence and/or state of disease, such as cancer. For example, certain radiopharmaceuticals, following administration to a patient, accumulate in regions of abnormal osteogenesis associated with malignant bone lesions, which are indicative of metastases. Other radiopharmaceuticals may bind to specific receptors, enzymes, and proteins in the body that are altered during evolution of disease. After administration to a patient, these molecules circulate in the blood until they find their intended target. The bound radiopharmaceutical remains at the site of disease, while the rest of the agent clears from the body.

Nuclear medicine imaging techniques capture images by detecting radiation emitted from the radioactive portion of the radiopharmaceutical. The accumulated radiopharmaceutical serves as a beacon so that an image may be obtained depicting the disease location and concentration using commonly available nuclear medicine modalities. Examples of nuclear medicine imaging modalities include bone scan imaging (also referred to as scintigraphy), single-photon emission computerized tomography (SPECT), and positron emission tomography (PET). Bone scan, SPECT, and PET imaging systems are found in most hospitals throughout the world. Choice of a particular imaging modality depends on and/or dictates the particular radiopharmaceutical used. For example, technetium 99m ($^{99m}Tc$) labeled compounds are compatible with bone scan imaging and SPECT imaging, while PET imaging often uses fluorinated compounds labeled with 18F. The compound $^{99m}Tc$ methylenediphosphonate ($^{99m}Tc$ MDP) is a popular radiopharmaceutical used for bone scan imaging in order to detect metastatic cancer. Radiolabeled prostate-specific membrane antigen (PSMA) targeting compounds such as $^{99m}Tc$ labeled 1404 and PyL™ (also referred to as [18F]DCFPyL) can be used with SPECT and PET imaging, respectively, and offer the potential for highly specific prostate cancer detection.

Accordingly, nuclear medicine imaging is a valuable technique for providing physicians with information that can be used to determine the presence and the extent of disease in a patient. The physician can use this information to provide a recommended course of treatment to the patient and to track the progression of disease.

For example, an oncologist may use nuclear medicine images from a study of a patient as input in her assessment of whether the patient has a particular disease, e.g., prostate cancer, what stage of the disease is evident, what the recommended course of treatment (if any) would be, whether surgical intervention is indicated, and likely prognosis. The oncologist may use a radiologist report in this assessment. A radiologist report is a technical evaluation of the nuclear medicine images prepared by a radiologist for a physician who requested the imaging study and includes, for example, the type of study performed, the clinical history, a comparison between images, the technique used to perform the study, the radiologist's observations and findings, as well as overall impressions and recommendations the radiologist may have based on the imaging study results. A signed radiologist report is sent to the physician ordering the study for the physician's review, followed by a discussion between the physician and patient about the results and recommendations for treatment.

Thus, the process involves having a radiologist perform an imaging study on the patient, analyzing the images obtained, creating a radiologist report, forwarding the report to the requesting physician, having the physician formulate an assessment and treatment recommendation, and having the physician communicate the results, recommendations, and risks to the patient. The process may also involve repeating the imaging study due to inconclusive results, or ordering further tests based on initial results. If an imaging study shows that the patient has a particular disease or condition (e.g., cancer), the physician discusses various treatment options, including surgery, as well as risks of doing nothing or adopting a watchful waiting or active surveillance approach, rather than having surgery.

Accordingly, the process of reviewing and analyzing multiple patient images, over time, plays a critical role in the diagnosis and treatment of cancer. There is, thus, a significant need for improved tools that facilitate and improve accuracy of image review and analysis for cancer diagnosis and treatment. Improving the toolkit utilized by physicians, radiologists, and other healthcare professionals in this manner provides for significant improvements in standard of care and patient experience.

SUMMARY OF THE INVENTION

Presented herein are systems and methods that provide for improved computer aided display and analysis of nuclear medicine images. In particular, the systems and methods described herein offer improved interactive adjustment of intensity windowing for display of nuclear medicine images. The interactive intensity window selection tools described herein utilize a nonlinear scaling function that maps user adjustments to positions of displayed indicator widgets on a scale to selected intensity window thresholds. The form of the scaling function increasingly magnifies user adjustments at the upper range of the scale, but remains linear at the lower end. The intensity windowing tools presented herein allow the user to adjust intensity thresholds over a full range of intensities encountered in an image, up to the maximum value, while still preserving fidelity in an important range that includes lower intensities. This approach allows the user to analyze high intensity regions, as are often representative of metastases, in detail.

Intensity windowing is used in the rendering of images for display, as part of the process of converting underlying stored pixel values of an image, which may be in a variety of units and vary over a wide numerical range, to the brightness levels and/or different colors with which images are visually displayed on screens, such as computer monitors. In particular, intensities of pixels in medical images often represent and/or are determined from physical quantities, such as electrical signal (e.g., current or voltage) produced by a detector, a power of light or another form of electromagnetic radiation, photon counts, and the like. In bone scan images, pixel intensities represent (e.g., have units of) (photon) counts, which are a number of photons registered from radioactive decay of a radiopharmaceutical injected in and accumulated within a patient prior to recording the image.

When an image is rendered for display, the pixel intensities are converted to grayscale levels or different colors so that variation in intensity, which represents a physical signal, can be inspected visually. For example, intensities of pixels in a bone scan image might range from a minimum of 0 counts to a maximum of around 10,000 counts. To display the bone scan image as an 8-bit (e.g., 256 level) grayscale image, different pixel intensities are assigned (e.g., mapped to) an integer grayscale level ranging from 0 (e.g., black) to 255 (e.g., white). An intensity window of 0 to 10,000 might initially be used, such that intensities ranging from 0 to 10,000 are converted to grayscale values of 0 to 255, for example using a linear function. Intensities of 0 or less would be assigned to 0 grayscale level, and intensities of 10,000 or greater mapped to a grayscale value of 255.

Using a finite number of grayscale levels to represent such a wide range of intensity values, however, means that small fluctuations in intensity are masked, and, even if a greater number of bits are used, such subtle variations in color would be indistinguishable to the human eye. Accordingly, intensity windows can be adjusted to emphasize and make apparent fluctuations occurring over small sub-ranges of intensity values. For example, rendering and displaying an image using an intensity window from 500 to 2,500 allocates all 256 grayscale levels to represent the sub-range from 500 to 2,500 counts. In this manner, small fluctuations in intensity over this sub-range are emphasized, and made readily observable, though at the expense of making variations outside of the intensity window unobservable.

Intensity windows can also be used to facilitate visual comparison between two or more images by rendering them in a manner that compensates for overall variations in their underlying intensity, such as constant baseline and/or multiplicative scaling, that occur from exogenous effects and correspond to noise. By choosing different intensity windows for different images, these effects are minimized or removed in images upon rendering and display, and only the meaningful, desired fluctuations in intensity are apparent.

Addressing such uncontrolled variations via intensity windowing is particularly important for bone scan imaging, as well as other nuclear medicine imaging modalities (e.g., SPECT imaging). In particular, as described herein, bone scan images are acquired by injecting a patient with a radiopharmaceutical, which accumulates in various regions of the patient's body, and emits radiation that is detected in order to form an image. High accumulation leads to high levels of radioactivity, and in turn, high count values. A high intensity or count value in a region of an image is indicative of a high amount of accumulation, while a count value of zero implies zero or very low radioactivity, and, accordingly, lower accumulation. Accordingly, fluctuations in intensity—count values, across a bone scan image can be used to infer accumulation levels of radiopharmaceutical in various regions, and, accordingly, presence and/or state of disease, such as metastases.

While comparison of multiple images is often important to assessing disease state and/or progression (e.g., for tracking disease progression over time for a single patient or comparing multiple patients in a study to evaluate efficacy of a drug, etc.), non-zero intensity values are not typically comparable between different bone scan images. This is because the exact intensity value (photon count) that is recorded also depends on a complex combination of factors such as dose, scan time, patient characteristics, and camera hardware. Accordingly, a healthcare professional reading bone scan images will use intensity windowing to adjust how brightness and/or color levels of displayed image pixels are determined from their underlying intensity value in an image such that similar regions have similar brightness and/or color levels upon display. Intensity windowing thus allows for images from different studies, such as images of a patient recorded at different time points, to be displayed in a manner that allows them to be visually compared with each other and analyzed in a meaningful fashion.

Notably, adjusting intensity windows in this manner is not trivial. In particular, the very wide range of intensity values that bone scan image pixels can take on makes performing fine and accurate adjustments to intensity window thresholds over such a wide range of values challenging. This is particularly problematic in images of patients with metastatic cancer, since radiopharmaceutical accumulates heavily in metastases, leading to extremely high intensities of corresponding image pixels. The interactive intensity window adjustment tools described herein address this challenge via a unique graphical control that allows the user to adjust positions of displayed indicator widgets along a scale. The graphical control utilizes a nonlinear scaling function to map increments along the scale to intensity values, such that intensity window thresholds are computed from adjustments to the displayed indicator widget positions. The special form of the scaling function is selected to magnify user adjustments to intensity thresholds at the upper end of the scale, where intensities vary rapidly and reach extreme values, but still remain linear and allow for finer adjustment at the lower end of the scale, where high fidelity is needed.

In this manner, the approaches described herein allow the user to analyze high intensity regions, as are often representative of metastases, in detail, with ease. Previously, setting intensity windows to allow for investigation of such high intensity regions was extremely challenging, time consuming and tedious, or not possible. The user friendly graphical control and adjustment procedure of the present disclosure allows the user to perform adjustments in a convenient fashion, without regard to the challenges addressed by the underlying scaling procedure. To the user, the software tools provided herein seem to "just work", allowing them to focus their attention on important tasks such as image review and decision making.

In one aspect, the invention is directed to a method for interactive adjustment of intensity window thresholds for display of a nuclear medicine image (e.g., a bone scan image; e.g., a PET image; e.g., a SPECT image), the method comprising: (a) accessing (e.g., receiving), by a processor of a computing device, the nuclear medicine image, said image comprising a plurality of pixels [e.g., pixels representing 2D areas; e.g., pixels representing 3D volumes (e.g., voxels)] each having an intensity representing a level of a detected signal (e.g., a photon count; e.g., a detector voltage; e.g., a detected power); (b) rendering, by the processor, the nuclear medicine image for graphical display according to an initial intensity window, said rendering comprising using a set of available colormap values [e.g., a set of grayscale and/or RGB values afforded by a particular bit-depth (e.g., 8-bit, 16-bit, 32-bit, etc.) used for graphical display] to visually represent the pixel intensities such that the full range of available colormap values are allocated to a subset of the pixel intensities that range from a minimum threshold of the initial intensity window to a maximum threshold of the initial intensity window [e.g., using a single, minimum colormap value of the set to represent pixel intensity values less than or equal to the minimum intensity threshold and using a single, maximum colormap value of the set to represent pixel intensity values greater than or equal to the maximum intensity threshold)]; (c) causing, by the processor, display of a graphical control element allowing for user selection of a subsequent intensity window, different from the initial intensity window, via user adjustment of one or more displayed indicator widgets from which one or more thresholds of the subsequent intensity window are determined, wherein the displayed indicator widgets are adjustable along a scale having increments that map to intensity values via a scaling function, wherein, for at least a portion of the increments, the scaling function is nonlinear; (d) receiving, by the processor a user selection of the subsequent intensity window corresponding to an adjusted position of the one or more displayed indicator widgets of the graphical control element; (e) responsive to receipt of the user selection of the subsequent intensity window, rendering, by the processor, for graphical display, the nuclear medicine image according to the subsequent intensity window, said rendering comprising using the set of available colormap values to visually represent the pixel intensities such that the full range of available colormap values are allocated to a subset of the pixel intensities that range from a minimum threshold of the subsequent intensity window to a maximum threshold of the subsequent intensity window, thereby creating an updated rendering; and (f) causing, by the processor, display of the updated rendering from step (e), thereby dynamically updating (e.g., in real time) display of the nuclear medicine image as the user adjusts selection the one or more displayed indicator widgets for selection of the subsequent intensity window.

In certain embodiments, the method comprises repeatedly performing steps (d)-(f) to update and display the nuclear medicine image in real-time, as the user adjusts the subsequent intensity window.

In certain embodiments, the graphical control element comprises a visual representation of the scale as a path (e.g., a slider), with the displayed indicator widgets having adjustable (e.g., via a user interaction with the graphical control element, such as a click, a drag-and-drop, etc.) positions along the path.

In certain embodiments, the scale comprises a reference increment that maps to a reference intensity value and the graphical control element comprises a visual indication of the reference increment along the path.

In certain embodiments, a minimum increment of the scale maps to a value of 0 intensity and a maximum increment of the scale maps to a maximum intensity value in the nuclear medicine image.

In certain embodiments, the scale comprises a reference increment that maps to a reference intensity value, wherein the scaling function has a larger slope for intensity values above the reference intensity value than for intensity values below the reference increment.

In certain embodiments, the scaling function is non-linear above the reference intensity value and linear below the reference intensity value.

In certain embodiments, the method comprises: prior to step (b), normalizing, by the processor, the nuclear medicine image using a normalization factor (e.g., a pre-set normalization factor; e.g., an automatically determined normalization factor; e.g., a user selected normalization factor), thereby producing a normalized version nuclear medicine image for rendering and display; and computing, by the processor, the reference intensity value as a function of the normalization factor [e.g., wherein the reference increment is proportional to the normalization factor (e.g., computed as a predetermined constant multiplied by the normalization factor)].

In certain embodiments, the reference increment is located more than halfway along the scale from a minimum to a maximum end of the scale (e.g., two-thirds of the way along the scale).

In certain embodiments, the method comprises, prior to step (b), normalizing, by the processor, the nuclear medicine image using a normalization factor (e.g., a pre-set normalization factor; e.g., an automatically determined normalization factor; e.g., a user selected normalization factor), thereby producing a normalized version of the nuclear medicine image for rendering and display.

In certain embodiments, the normalization factor is determined by (e.g., iteratively) identifying, by the processor, healthy tissue regions in the nuclear medicine image determined not to include any hotspots (e.g., localized regions of relatively high intensity) and calculating, by the processor, a normalization factor such that a product of the normalization factor and an average intensity of the identified healthy tissue regions is a pre-defined intensity level.

In certain embodiments, the nuclear medicine image is a bone scan image (e.g., a whole body bone scan image).

In another aspect, the invention is directed to a system for interactive adjustment of intensity window thresholds for display of a nuclear medicine image (e.g., a scintigraphy image; e.g., a PET image; e.g., a SPECT image), the system comprising: a processor of a computing device; and a memory having instructions stored thereon, wherein the instructions, when executed by the processor, cause the processor to: (a) access (e.g., receive) the nuclear medicine image, said image comprising a plurality of pixels [e.g., pixels representing 2D areas; e.g., pixels representing 3D volumes (e.g., voxels)] each having an intensity representing a level of a detected signal (e.g., a photon count; e.g., a detector voltage; e.g., a detected power); (b) render, for graphical display, the nuclear medicine image according to an initial intensity window using a set of available colormap values [e.g., a set of grayscale and/or RGB values afforded by a particular bit-depth (e.g., 8-bit, 16-bit, 32-bit, etc.) used for graphical display] to visually represent the pixel intensities such that the full range of available colormap values are allocated to a subset of the pixel intensities that range from a minimum threshold of the initial intensity window to a maximum threshold of the initial intensity window [e.g., using a single, minimum colormap value of the set to represent pixel intensity values less than or equal to the minimum intensity threshold and using a single, maximum colormap value of the set to represent pixel intensity values greater than or equal to the maximum intensity threshold)]; (c) cause display of a graphical control element allowing for user selection of a subsequent intensity window, different from the initial intensity window, via user adjustment of one or more displayed indicator widgets from which one or more thresholds of the subsequent intensity window are determined, wherein the displayed indicator widgets are adjustable along a scale having increments that map to intensity values via a scaling function, wherein, for at least a portion of the increments, the scaling function is nonlinear; (d) receive a user selection of the subsequent intensity window corresponding to an adjusted position of the one or more displayed indicator widgets of the graphical control element; (e) responsive to receipt of the subsequent intensity window, render, for graphical display, the nuclear medicine image according to the subsequent intensity window using the set of available colormap values to visually represent the pixel intensities such that the full range of available colormap values are allocated to a subset of the pixel intensities that range from a minimum threshold of the subsequent intensity window to a maximum threshold of the subsequent intensity window, thereby creating an updated rendering; and (f) cause display of the updated rendering from step (e) thereby dynamically updating (e.g., in real time) display of the nuclear medicine image as the user adjusts selection the one or more displayed indicator widgets for selection of the subsequent intensity window.

In certain embodiments, the instructions cause the processor to repeatedly perform steps (d)-(f) to update and display the nuclear medicine image in real-time, as the user adjusts the subsequent intensity window.

In certain embodiments, the graphical control element comprises a visual representation of the scale as a path (e.g., a slider), with the displayed indicator widgets having adjustable (e.g., via a user interaction with the graphical control element, such as a click, a drag-and-drop, etc.) positions along the path.

In certain embodiments, the scale comprises a reference increment that maps to a reference intensity value and the graphical control element comprises a visual indication of the reference increment along the path.

In certain embodiments, a minimum increment of the scale maps to a value of 0 intensity and a maximum increment of the scale maps to a maximum intensity value in the nuclear medicine image.

In certain embodiments, the scale comprises a reference increment that maps to a reference intensity value, wherein the scaling function has a larger slope for intensity values above the reference intensity value than for intensity values below the reference increment.

In certain embodiments, the scaling function is non-linear above the reference intensity value and linear below the reference intensity value.

In certain embodiments, the instructions cause the processor to: prior to step (b), normalize the nuclear medicine image using a normalization factor (e.g., a pre-set normalization factor; e.g., an automatically determined normalization factor; e.g., a user selected normalization factor), thereby producing a normalized version of the nuclear medicine image for rendering and display; and compute the reference intensity value as a function of the normalization factor [e.g., wherein the reference increment is proportional to the normalization factor (e.g., computed as a predetermined constant multiplied by the normalization factor)].

In certain embodiments, the reference increment is located more than halfway along the scale from a minimum to a maximum end of the scale (e.g., two-thirds of the way along the scale).

In certain embodiments, the instructions cause the processor to, prior to step (b): normalize the nuclear medicine image using a normalization factor (e.g., a pre-set normalization factor; e.g., an automatically determined normalization factor; e.g., a user selected normalization factor), thereby producing a normalized version of the nuclear medicine image for rendering and display.

In certain embodiments, the instructions cause the processor to determine the normalization factor by (e.g., iteratively) identifying healthy tissue regions in the nuclear medicine image determined not to include any hotspots (e.g., localized regions of relatively high intensity) and calculating the normalization factor such that a product of the normalization factor and an average intensity of the identified healthy tissue regions is a pre-defined intensity level.

In certain embodiments, the nuclear medicine image is a bone scan image (e.g., a whole body bone scan image).

Embodiments described with respect to one aspect of the invention may be, applied to another aspect of the invention (e.g., features of embodiments described with respect to one independent claim, e.g., a method claim, are contemplated to be applicable to other embodiments of other independent claims, e.g., a system claim, and vice versa).

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 8C is a screenshot of a graphical user interface (GUI) for reviewing patient information, used with a software based implementation of the quality control and reporting workflow shown in FIG. 8A, according to an illustrative embodiment.

DETAILED DESCRIPTION

Figure 1:
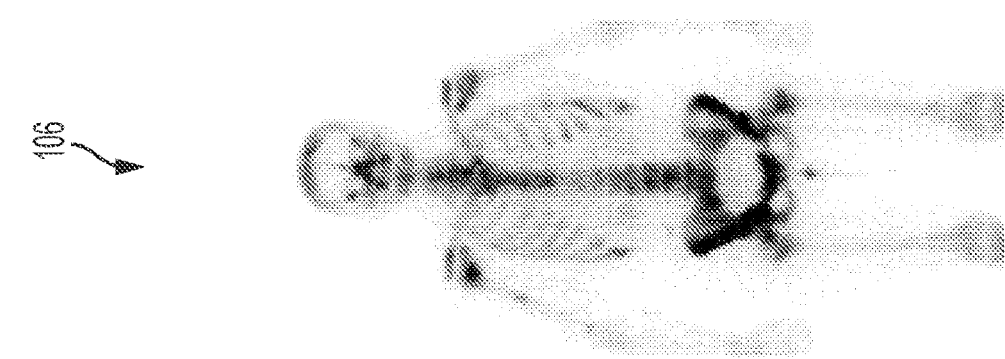
FIG. 1 is a set of bone scan images from three studies of a same patient, displayed without normalization and without intensity window adjustment, according to an illustrative embodiment.
Figure 1:
Figure 1:
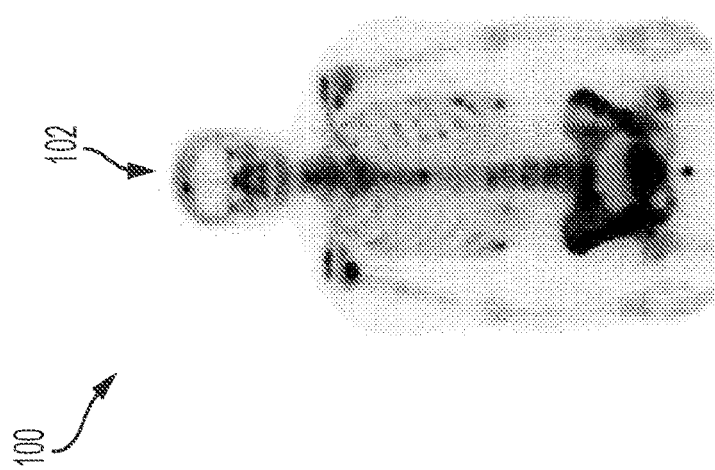

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader— the presence and/or placement of a header is not intended to limit the scope of the subject matter described herein.

In this application, the use of "or" means "and/or" unless stated otherwise. As used in this application, the term "comprise" and variations of the term, such as "comprising" and "comprises," are not intended to exclude other additives, components, integers or steps. As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

The articles "a" and "an" are used herein to refer to one or to more than one (i.e., at least one) of the grammatical object of the article. By way of example, "an element" means one element or more than one element. Thus, in this specification and the appended claims, the singular forms "a," "an," and "the" include plural references unless the context clearly dictates otherwise. Thus, for example, reference to a pharmaceutical composition comprising "an agent" includes reference to two or more agents.

The systems and methods described herein are directed to a unique and user-friendly approach for selecting intensity windows for display of nuclear medicine images. The approaches are described herein with particular relevance to bone scan, also referred to as scintigraphy, images, but also are applicable to other nuclear medicine imaging modalities for which adjustment of intensity windows is needed or useful for comparison between images. Such adjustment is particularly important for imaging modalities where measured intensity values are not standardized to a common unit or reference value, and can vary by constant baselines and/or multiplicative factors. This variably presents a significant challenge to meaningful review and comparison of images, and is present in scintigraphy images, as well as, for example, single photon emission tomography (SPECT) images.

A. Nuclear Medicine Images

Nuclear medicine images are obtained using a nuclear imaging modality such as bone scan imaging, Positron Emission Tomography (PET) imaging, and Single-Photon Emission Tomography (SPECT) imaging.

As used herein, an "image"—for example, a 3-D image of mammal—includes any visual representation, such as a photo, a video frame, streaming video, as well as any electronic, digital or mathematical analogue of a photo, video frame, or streaming video. Any apparatus described herein, in certain embodiments, includes a display for displaying an image or any other result produced by the processor. Any method described herein, in certain embodiments, includes a step of displaying an image or any other result produced via the method.

As used herein, "3-D" or "three-dimensional" with reference to an "image" means conveying information about three dimensions. A 3-D image may be rendered as a dataset in three dimensions and/or may be displayed as a set of two-dimensional representations, or as a three-dimensional representation In certain embodiments, nuclear medicine images use imaging agents comprising radiopharmaceuticals. Nuclear medicine images are obtained following administration of a radiopharmaceutical to a patient (e.g., a human subject), and provide information regarding the distribution of the radiopharmaceutical within the patient. Radiopharmaceuticals are compounds that comprise a radionuclide.

As used herein, "administering" an agent means introducing a substance (e.g., an imaging agent) into a subject. In general, any route of administration may be utilized including, for example, parenteral (e.g., intravenous), oral, topical, subcutaneous, peritoneal, intraarterial, inhalation, vaginal, rectal, nasal, introduction into the cerebrospinal fluid, or instillation into body compartments As used herein, "radionuclide" refers to a moiety comprising a radioactive isotope of at least one element. Exemplary suitable radionuclides include but are not limited to those described herein. In some embodiments, a radionuclide is one used in positron emission tomography (PET). In some embodiments, a radionuclide is one used in single-photon emission computed tomography (SPECT). In some embodiments, a non-limiting list of radionuclides includes $^{99m}$Tc, $^{111}$In, $^{64}$Cu, $^{67}$Ga, $^{68}$Ga, $^{186}$Re, $^{188}$Re, $^{153}$Sm, $^{177}$Lu, $^{67}$Cu, $^{123}$I, $^{124}$I, $^{125}$I, $^{126}$I, $^{131}$I, $^{11}$C, $^{13}$N, $^{15}$O, $^{18}$F, $^{153}$Sm, $^{166}$Ho, $^{177}$Lu, $^{149}$Pm, $^{90}$Y, $^{213}$Bi, $^{103}$Pd, $^{109}$Pd, $^{159}$Gd, $^{140}$La, $^{198}$Au, $^{199}$Au, $^{169}$Yb, $^{175}$Yb, $^{165}$Dy, $^{166}$Dy, $^{105}$Rh, $^{111}$Ag, $^{89}$Zr, $^{225}$Ac, $^{82}$Rb, $^{75}$Br, $^{76}$Br, $^{77}$Br, $^{80}$Br, $^{80m}$Br, $^{82}$Br, $^{83}$Br, $^{211}$At and $^{192}$Ir.

As used herein, the term "radiopharmaceutical" refers to a compound comprising a radionuclide. In certain embodiments, radiopharmaceuticals are used for diagnostic and/or therapeutic purposes. In certain embodiments, radiopharmaceuticals include small molecules that are labeled with one or more radionuclide(s), antibodies that are labeled with one or more radionuclide(s), and antigen-binding portions of antibodies that are labeled with one or more radionuclide(s).

Nuclear medicine images (e.g., PET scans; e.g., SPECT scans; e.g., whole-body bone scans; e.g. composite PET-CT images; e.g., composite SPECT-CT images) detect radiation emitted from the radionuclides of radiopharmaceuticals to form an image. The distribution of a particular radiopharmaceutical within a patient may be determined by biological mechanisms such as blood flow or perfusion, as well as by specific enzymatic or receptor binding interactions. Different radiopharmaceuticals may be designed to take advantage of different biological mechanisms and/or particular specific enzymatic or receptor binding interactions and thus, when administered to a patient, selectively concentrate within particular types of tissue and/or regions within the patient. Greater amounts of radiation are emitted from regions within the patient that have higher concentrations of radiopharmaceutical than other regions, such that these regions appear brighter in nuclear medicine images. Accordingly, intensity variations within a nuclear medicine image can be used to map the distribution of radiopharmaceutical within the patient. This mapped distribution of radiopharmaceutical within the patient can be used to, for example, infer the presence of cancerous tissue within various regions of the patient's body.

For example, upon administration to a patient, technetium 99m methylenediphosphonate ($^{99m}$Tc MDP) selectively accumulates within the skeletal region of the patient, in particular at sites with abnormal osteogenesis associated with malignant bone lesions. The selective concentration of radiopharmaceutical at these sites produces identifiable hotspots—localized regions of high intensity in nuclear medicine images. Accordingly, presence of malignant bone lesions associated with metastatic prostate cancer can be inferred by identifying such hotspots within a whole-body scan of the patient. As described in the following, risk indices that correlate with patient overall survival and other prognostic metrics indicative of disease state, progression, treatment efficacy, and the like, can be computed based on automated analysis of intensity variations in whole-body scans obtained following administration of $^{99m}$Tc MDP to a patient. In certain embodiments, other radiopharmaceuticals can also be used in a similar fashion to $^{99m}$Tc MDP.

In certain embodiments, the particular radiopharmaceutical used depends on the particular nuclear medicine imaging modality used. For example 18F sodium fluoride (NaF) also accumulates in bone lesions, similar to $^{99m}$Tc MDP, but can be used with PET imaging. In certain embodiments, PET imaging may also utilize a radioactive form of the vitamin choline, which is readily absorbed by prostate cancer cells.

In certain embodiments, radiopharmaceuticals that selectively bind to particular proteins or receptors of interest—particularly those whose expression is increased in cancerous tissue may be used. Such proteins or receptors of interest include, but are not limited to tumor antigens, such as CEA, which is expressed in colorectal carcinomas, Her2/neu, which is expressed in multiple cancers, BRCA 1 and BRCA 2, expressed in breast and ovarian cancers; and TRP-1 and -2, expressed in melanoma.

For example, human prostate-specific membrane antigen (PSMA) is upregulated in prostate cancer, including metastatic disease. PSMA is expressed by virtually all prostate cancers and its expression is further increased in poorly differentiated, metastatic and hormone refractory carcinomas. Accordingly, radiopharmaceuticals corresponding to PSMA binding agents (e.g., compounds that a high affinity to PSMA) labelled with one or more radionuclide(s) can be used to obtain nuclear medicine images of a patient from which the presence and/or state of prostate cancer within a variety of regions (e.g., including, but not limited to skeletal regions) of the patient can be assessed. In certain embodiments, nuclear medicine images obtained using PSMA binding agents are used to identify the presence of cancerous tissue within the prostate, when the disease is in a localized state. In certain embodiments, nuclear medicine images obtained using radiopharmaceuticals comprising PSMA binding agents are used to identify the presence of cancerous tissue within a variety of regions that include not only the prostate, but also other organs and tissue regions such as lungs, lymph nodes, and bones, as is relevant when the disease is metastatic.

In particular, upon administration to a patient, radionuclide labelled PSMA binding agents selectively accumulate within cancerous tissue, based on their affinity to PSMA. In a similar manner to that described above with regard to $^{99m}$Tc MDP, the selective concentration of radionuclide labelled PSMA binding agents at particular sites within the patient produces detectable hotspots in nuclear medicine images. As PSMA binding agents concentrate within a variety of cancerous tissues and regions of the body expressing PSMA, localized cancer within a prostate of the patient and/or metastatic cancer in various regions of the patient's body can be detected, and evaluated. Risk indices that correlate with patient overall survival and other prognostic metrics indicative of disease state, progression, treatment efficacy, and the like, can be computed based on automated analysis of intensity variations in nuclear medicine images obtained following administration of a PSMA binding agent radiopharmaceutical to a patient.

A variety of radionuclide labelled PSMA binding agents may be used as radiopharmaceutical imaging agents for nuclear medicine imaging to detect and evaluate prostate cancer. In certain embodiments, the particular radionuclide labelled PSMA binding agent that is used depends on factors such as the particular imaging modality (e.g., PET; e.g., SPECT) and the particular regions (e.g., organs) of the patient to be imaged. For example, certain radionuclide labelled PSMA binding agents are suited for PET imaging, while others are suited for SPECT imaging. For example, certain radionuclide labelled PSMA binding agents facilitate imaging a prostate of the patient, and are used primarily when the disease is localized, while others facilitate imaging organs and regions throughout the patient's body, and are useful for evaluating metastatic prostate cancer.

A variety of PSMA binding agents and radionuclide labelled versions thereof are described in U.S. Pat. Nos. 8,778,305, 8,211,401, and 8,962,799, each of which are incorporated herein by reference in their entireties. Several PSMA binding agents and radionuclide labelled versions thereof are also described in PCT Application PCT/US2017/058418, filed Oct. 26, 2017, the content of which is incorporated herein by reference in its entirety.

B. Bone Scan Images

In scintigraphy images, intensity values of image pixels signify counts, which are a number of photons registered from decay of a radiopharmaceutical injected into the patient prior to the scan. As described herein, for example in Section A above, the radiopharmaceutical accumulates in various structures in the body based on, e.g., its biochemical properties, and intensities (e.g., counts) of image pixels that correspond to physical locations in those structures vary with accumulation of the radiopharmaceutical therein. Higher accumulation leads to high levels of radioactivity, and, in turn, high count values. Pixels having zero intensity or count value indicate zero or very low radioactivity at corresponding physical locations within the patient, and, accordingly, lower accumulation of radiopharmaceutical.

Figure 2:
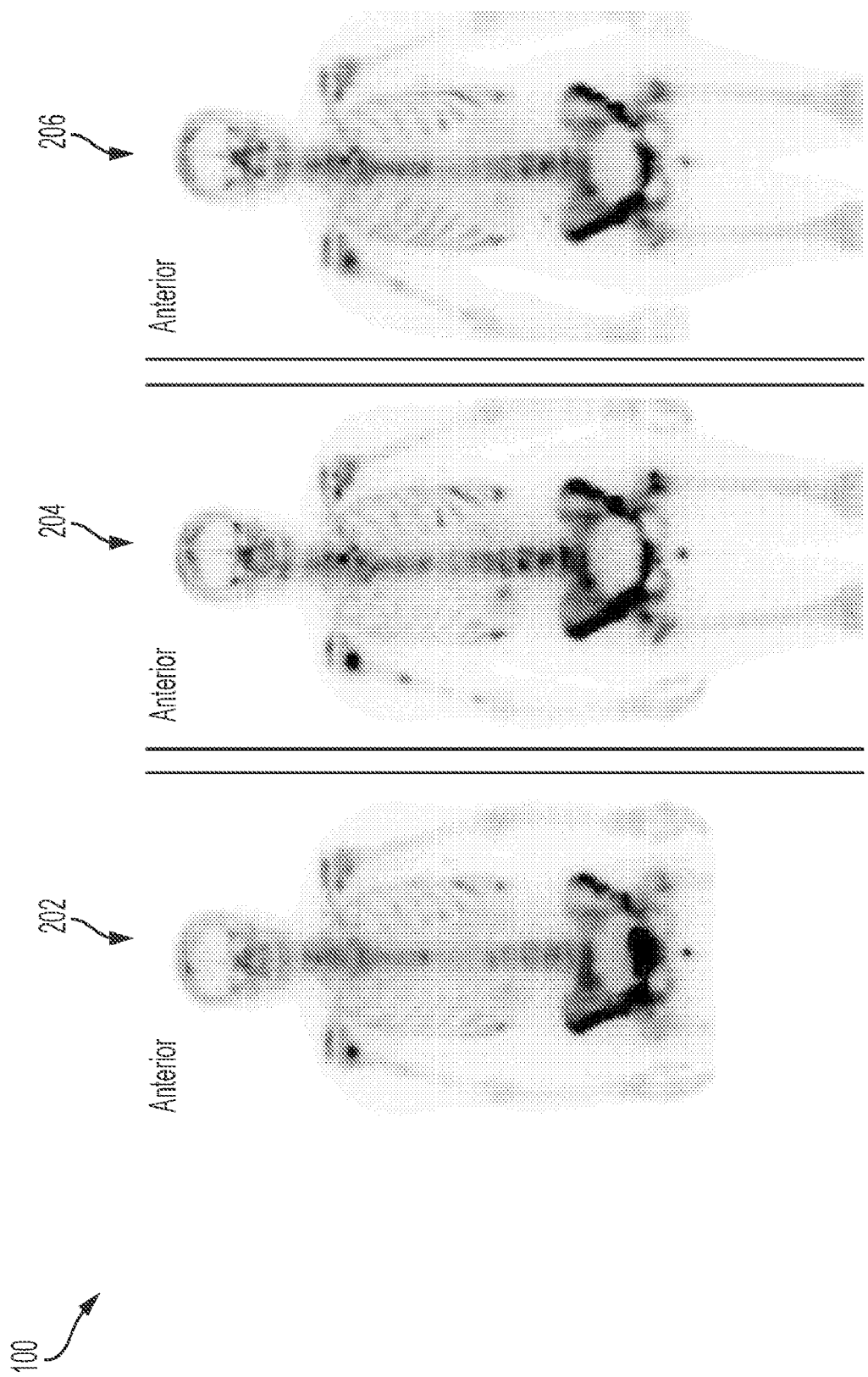
FIG. 2 is the same set of bone scan images shown in FIG. 1, displayed following normalization and using an initial intensity window, according to an illustrative embodiment.

However, non-zero intensity values are not comparable between different scintigraphy image scans because they depend on a complex combination of different factors, such as dose, scan time, patient characteristics, and camera hardware. These factors can vary from scan to scan, and influence both the accumulation level of the radiopharmaceutical itself, as well as efficiency with which counts of emitted photons are measured. To address this variability between scans, a healthcare professional reading bone scan images therefore uses intensity windowing to display bone scan images such that similar regions are displayed with similar brightness and/or color levels. Doing so facilitates comparison and analysis of displayed images, as illustrated in FIG. 1 and FIG. 2, which show sets of bone scan images for a same patient, but at different times, without (FIG. 1) and with (FIG. 2) intensity windowing.

As used herein, the term "intensity window" refers to a range of pixel intensity values (a window) over which rendered brightness and/or color level varies with underlying image pixel intensity. Outside of the intensity window, brightness and/or color levels with which image pixels are rendered for display remains constant even as underlying pixel intensity values vary. Intensity windows typically are defined in terms of a minimum and maximum threshold. Pixel intensities ranging from 0 to the minimum threshold are all displayed using a same, minimum brightness or color level value, and pixel intensities above the maximum threshold are all displayed using a same maximum brightness or color level value. Pixel intensities ranging from the minimum to the maximum threshold fall within the intensity window, and are displayed using brightness or color levels that vary with pixel intensity.

For example, pixel intensities of medical images, such as nuclear medicine images, often represent a physical value, such as counts. Such pixel intensities may vary over a wide range of values, and have integer or floating point units. In order to be displayed, these underlying pixel values are mapped to available colormap (e.g., grayscale; e.g., RGB) values. Using an intensity window allows a full range of grayscale or color levels to be used to represent a portion of pixel intensities falling within the intensity window. Since the full range of grayscale and/or color levels is used to represent a limited range of pixel intensities, this approach can make variations in pixel intensities within the intensity window easier to observe. Intensity variations outside the window, however, are not observable, since a single minimum and/or maximum grayscale and/or color level is used to represent all intensities above and/or below the window.

Figure 3:
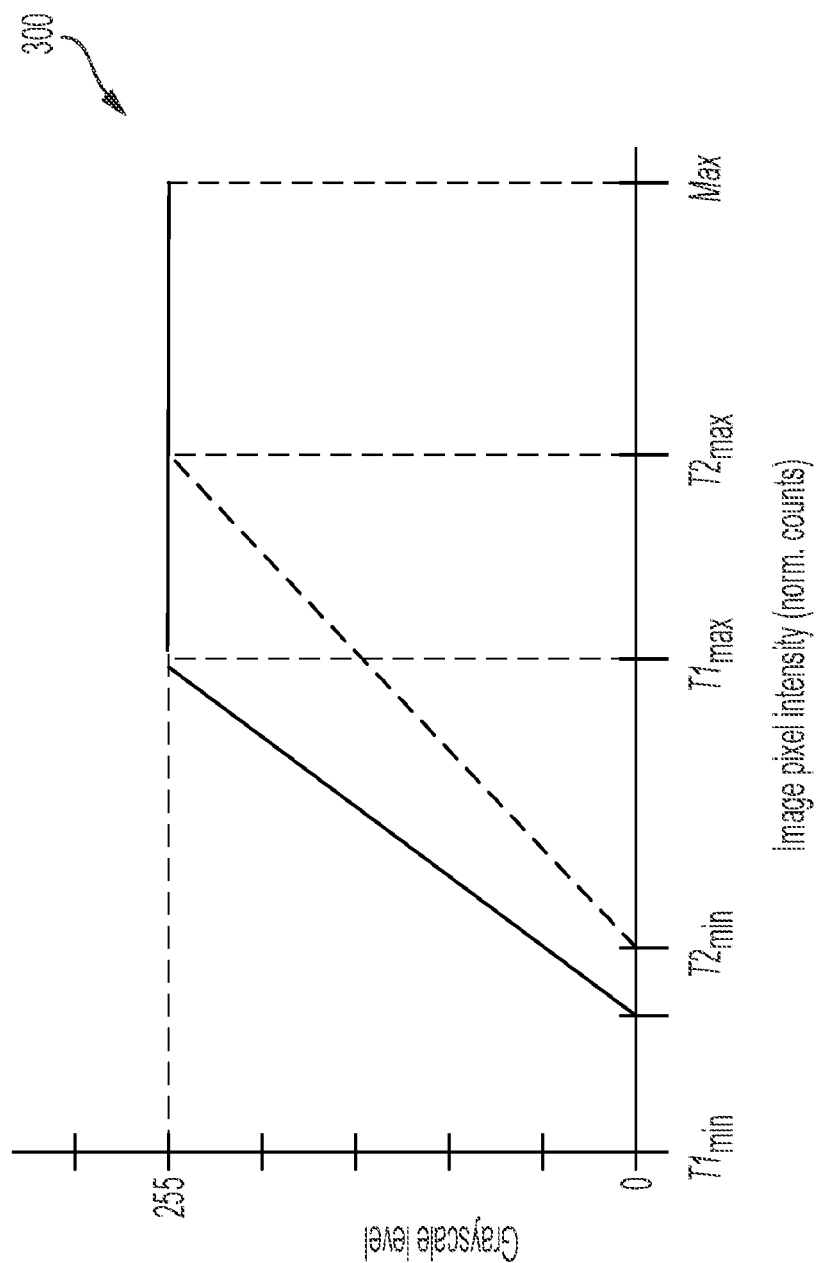
FIG. 3 is a graph illustrating use of intensity windows for image display, according to an illustrative embodiment.

FIG. 3 shows a graph illustrating use of two different intensity windows for display of an image using 256 grayscale levels. As shown in the figure, a first intensity window has minimum and maximum thresholds $T1_{min}$ and $T1_{max}$, respectively, and a second intensity window has minimum and maximum thresholds $T2_{min}$ and $T2_{max}$, respectively. When the first intensity window is used, the full range of grayscale levels from 0 to 255 is used to represent pixel intensity variations from $T1_{min}$ to $T1_{max}$. Intensities below $T1_{min}$ are all represented with the minimum grayscale level of 0, and intensities above $T1_{max}$ are represented using the maximum grayscale level of 255. The second intensity window has different thresholds and, accordingly, allocates the full range of grayscale levels to represent a different portion of the underlying pixel intensity values. In this manner, intensity windowing can be used to render and display images in a manner that accounts for unstandardized variations from image to image, such as multiplicative scaling differences and baseline shifts, and, accordingly, allows for them to be compared upon display.

C. Interactive Selection and Adjustment of Intensity Windows

Figure 4:
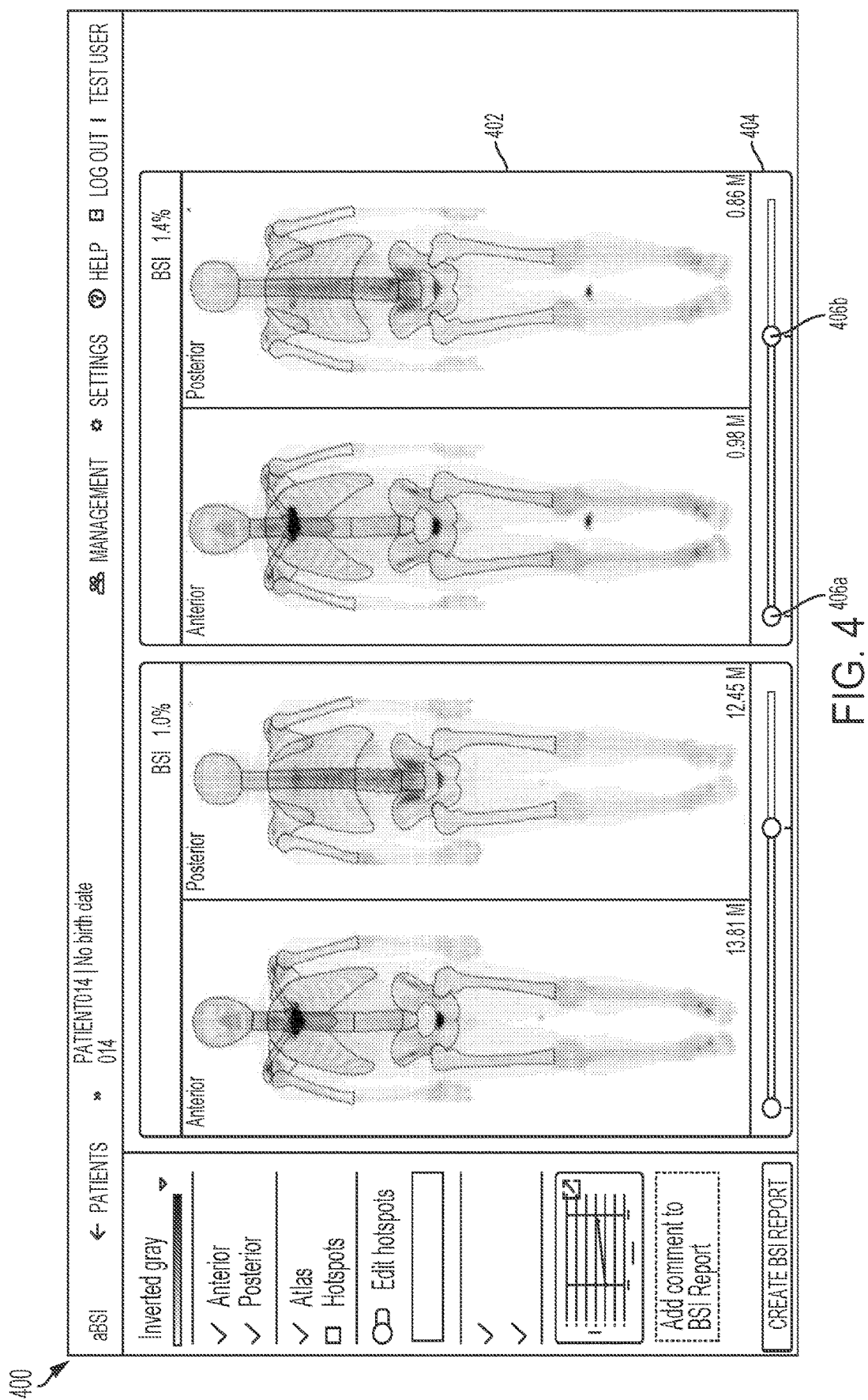
FIG. 4 is a screenshot of a graphical user interface for viewing bone scan images, wherein the (GUI) comprises graphical control elements for adjustment of intensity windows used for display of the bone scan images, according to an illustrative embodiment.

Selection of intensity windows is non-trivial, and can be challenging and time consuming even for trained healthcare professionals who are responsible for image review and analysis. In particular, the very wide range of intensity values that bone scan image pixels can take on makes performing fine and accurate adjustments to intensity window thresholds over such a wide range of values challenging. This is particularly problematic in images of patients with metastatic cancer, since a radiopharmaceutical accumulates heavily in metastases, leading to extremely high intensities of corresponding image pixels. The interactive intensity window adjustment tools described herein address this challenge via unique graphical control elements, such as those shown in FIG. 4, that allow the user to adjust positions of displayed indicator widgets along a scale. FIG. 4 shows a graphical control element in which the displayed indicator widgets are adjustable sliders along a path. Other controls and widget elements are also possible, for example the displayed indicator widgets may be radio buttons, circular dials, various skeuomorphic controls, and the like. The graphical control utilizes a nonlinear scaling function to map increments along the scale to intensity values, such that intensity window thresholds are computed from adjustments to the displayed indicator widget positions. The special form of the scaling function is selected to magnify user adjustments to intensity thresholds at the upper end of the scale, where intensities vary rapidly and reach extreme values, but still remain linear and allow for finer adjustment at the lower end of the scale, where high fidelity is needed.

In this manner, the approaches described herein allow the user to analyze high intensity regions, as are often representative of metastases, in detail, with ease. Previously, setting intensity windows to allow for investigation of such high intensity regions was extremely challenging, time consuming and tedious, or not possible. The user friendly graphical control and adjustment procedure allows the user to perform adjustments in a convenient fashion, without regard to the challenges addressed by the underlying scaling approach. To the user, the software tools provided herein seem to "just work", allowing them to focus their attention on important tasks such as image review and decision making.

Figure 5:
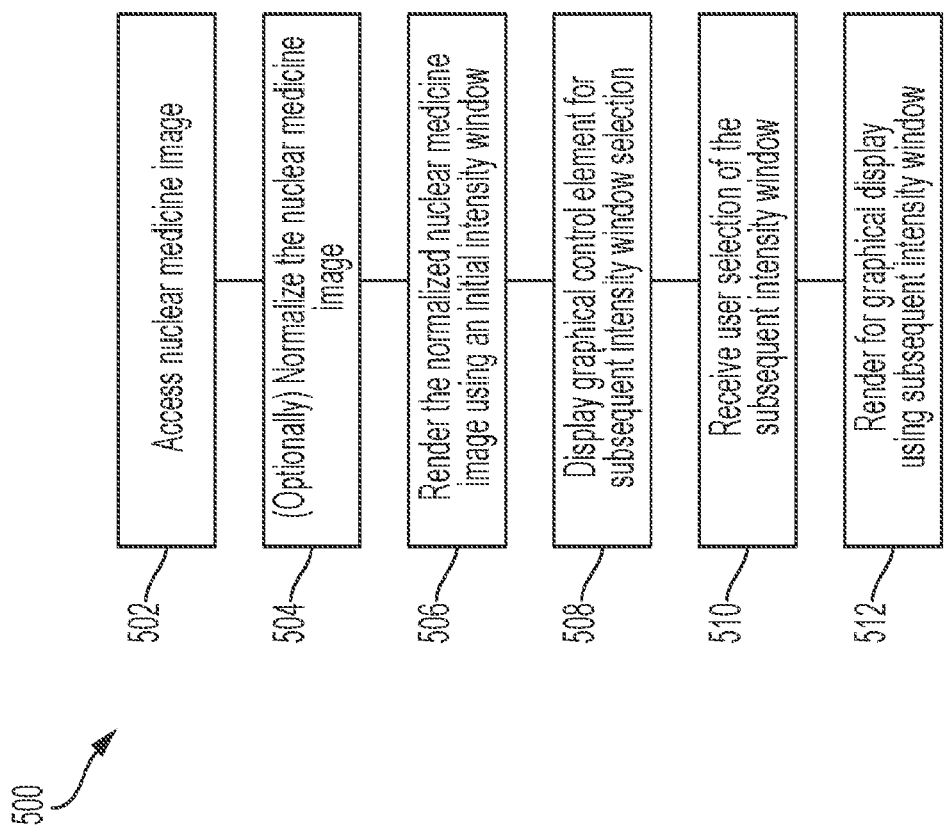
FIG. 5 is a block flow diagram showing a process for interactive adjustment of intensity windows in accordance with the approaches described herein, according to an illustrative embodiment.

FIG. 5 shows an example process 500 for interactive adjustment of intensity windowing for display of nuclear medicine images. In a first step, nuclear medicine images are accessed, and/or received by a processor. FIG. 1 shows a set 100 of displayed bone scan images 102, 104, 106, obtained for a particular patient, but at different times. The images 102, 104, and 106, are not normalized, and displayed without intensity windowing. Overall intensities and, accordingly, displayed grayscale levels, vary significantly from image to image, even comparing similar regions of the patient.

In order to display such images in a manner that allows them to be compared in a meaningful fashion, normalization 504 and intensity windowing 506 steps may be performed. FIG. 2 shows the same set of bone scan images of FIG. 1, but displayed following normalization and using intensity windowing. Displayed grayscale levels now are comparable across the different images, 202, 204, and 206, allowing them to be analyzed and compared.

In certain embodiments, images are first normalized using a normalization factor. The normalization factor may be a multiplicative factor that, when used, scales intensities of image pixels such that an average intensity over regions identified as corresponding to healthy skeletal tissue is a predefined constant. Normalization of the images shown in FIG. 2 was performed using a normalization factor that scaled average healthy pixel intensities to a value of 1000. The level 1000 is arbitrary, and just needs to be the same across studies and patients. The normalization performed is strictly multiplicative, and does not shift a known reference level of zero counts—zero counts will remain zero counts following normalization.

In certain embodiments, in order to determine the normalization factor, healthy tissue regions within the nuclear medicine image to be normalized are first identified. Such regions may be identified by automated segmentation to identify a graphical representation of a skeleton in the nuclear medicine image, followed by automated identification of hotspots, which correspond to localized regions of high intensity. Image pixels lying within the identified graphical representation of the skeleton, but outside of any identified hotspots, are identified as belonging to healthy tissue regions. Intensities of these pixels are then used to determine an average intensity of healthy skeletal tissue and, accordingly, determine the normalization factor. An example of an iterative approach for normalizing bone scan images in this manner is described in U.S. patent application Ser. No. 15/282,422, filed Sep. 30, 2016, and in U.S. Pat. No. 8,855,387, issued Oct. 7, 2014 (of which U.S. patent application Ser. No. 15/282,422 is a reissue), the contents of each of which are hereby incorporated by reference in their entirety.

The images in FIG. 2 are rendered and displayed using a fixed, initial intensity window 506. In certain embodiments, automated normalization allows images to be displayed using a fixed, initial intensity window that is suitable for an overview (e.g., rough, high-level review) of a bone scan image. In certain embodiments, however, adjustment of intensity windowing to select a subsequent, different, intensity window, is performed to allow for the image to be displayed such that regions of high or low uptake can be investigated in greater detail. Graphical user interfaces (GUIs) for display and/or review of bone scan images may include a graphical control element that provides for selection of the subsequent intensity window 508.

FIG. 4 shows a screenshot of an example GUI that includes a graphical control element 404 for user selection of the subsequent intensity window. Graphical control element 404 is a slider that allows the user to select minimum and maximum thresholds of the subsequent intensity window by adjusting positions of displayed indicator widgets 406a and 406b along the slider bar. The slider scale ranges from a minimum to a maximum possible intensity window threshold, and positional along the slider scale map to intensity values. The minimum and maximum thresholds of the intensity window are computed from the positions of the displayed indicator widgets, allowing the user to adjust them via interaction with the slider 404. In this manner, a user selection of the subsequent intensity window is received 510 via the graphical control element, and the is rendered for graphical display using the subsequent intensity window 512. The GUI 400 may display the updated bone scan image 402 so that the user can interactively adjust the graphical control and view results.

Previous approaches used sliders scales ranging from 0 to 100, with a minimum scale increment of 0 representing 0 counts and a maximum scale increment of 100 representing a reference value, r, set to be proportional to the normalization factor. Varying locations of the displayed indicator widget along this slider scale produced a corresponding proportional (e.g., linear) change in the threshold values of the intensity window.

An example reference value is $r=7000/f$, where f is the normalization factor and the initial intensity window was set to range from 0 to r. Previous approaches thus did not allow for the maximum threshold to be increased above the reference value. Since intensities of pixels corresponding to metastatic regions can lie above the reference value, the previous approach did not allow for these regions to be investigated in detail.

Allowing the slider scale to represent pixel intensity values ranging from 0 to the maximum intensity found in each image would cover the entire range of intensities that may be of interest, but sacrifices the range and level of control over which a user can adjust thresholds below the reference value. Since this range, at the bottom of the scale, is the most useful in practice, merely extending the slider scale range is not a viable approach.

Instead, the systems and methods described herein utilize a custom slider where the range is from 0 (left) to the maximum value (right), but using a non-linear scale where the reference level is placed at ⅔ of the distance towards the maximum.

The proposed bottom scale places the reference value at ⅔ of the way from 0 to maximum. To ensure a familiar user experience the window increases linearly in size between 0 and the reference value. Between the reference and maximum values a non-linear (e.g., quadratic) function is used, wherein the derivative is equal to that of the linear curve at the reference point. The curve then increases in a non-linear, e.g., quadratic, fashion towards the maximum value. This approach allows the entire intensity window to be explored without losing fidelity in the important 0 to reference range.

Figure 6:
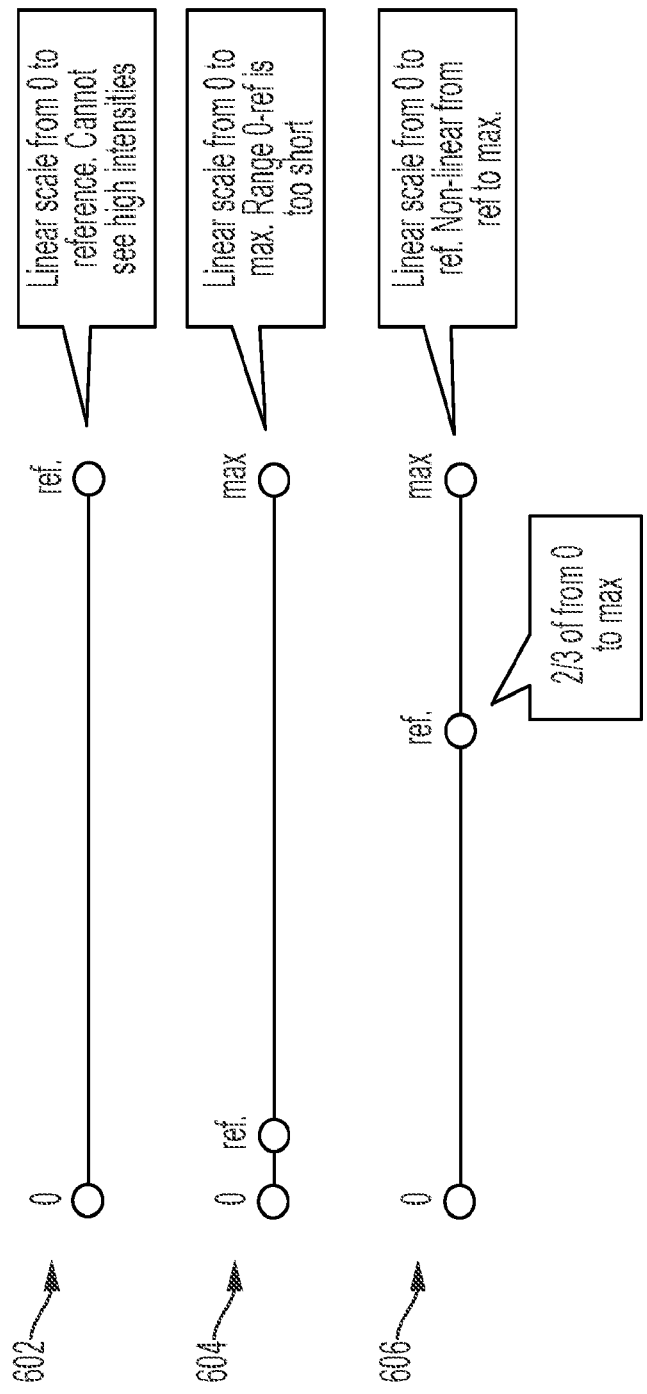
FIG. 6 is a schematic illustrating different slider scaling approaches, according to an illustrative embodiment.

FIG. 6 illustrates the custom slider 606 described herein in comparison with the two other above described approaches. As illustrated in FIG. 6, a limited linear slider 602 that only ranges from 0 to the reference value prevents a user from adjusting threshold values above the reference level, and prohibits high intensity regions from being explored. However, a larger linear slider that ranges from 0 to the maximum intensity value (slider 604) provides an unmanageably small 0 to reference portion, such that meaningful adjustment of intensity window thresholds in the important 0 to reference value range is not possible. The custom slider 606 uses a nonlinear function over a portion (higher end) of the scale, and solves the shortcomings of the other approaches, providing new functionality.

An example approach for determining a slider scaling function is as follows, where r is the reference value and the maximum intensity value found in an image denoted m. The scale has increments ranging from 0 to 1.5, with the increment at 1 corresponding to a reference increment that maps to the reference value. For intensity values ranging from 0 to r, the scaling function that maps location on the scale, x, to intensity value, f(x), is:

$$f_1(x)=r\,x,$$

where $f_1(0)=0$, and $f_1(1)=r$. The derivative, $f_1'(x)$, is $f_1''(x)=r$, showing that the slope of the curve is r. For the upper end interval of the scale, corresponding to increments ranging from 1 to 1.5, which map to intensity values from r to m, a nonlinear, quadratic function, $f_1(x)$ is used. The quadratic function as the form $f_2(x)=a+bx+cx^2$, with a, b, and c constants having values such that $f_2(1)=r$, $f_2'(1)=r$, and $f_2(1.5)=m$. That is, the value of the non-linear part of the scaling function at 1 should be r, the slope at 1 should also be r, and the value at 1.5 should be m. This system of three equations with three unknowns (a, b and c) has a unique solution. Solving for a, b, and c yields:

$$a=c=4m-6r, \text{ and}$$

$$b=13r-8m.$$

The resulting equation of the nonlinear portion of the scaling function is thus, $$f_2(x)=4m-6r+(13r-8m)x+(4m-6r)x^2$$

Figure 7:
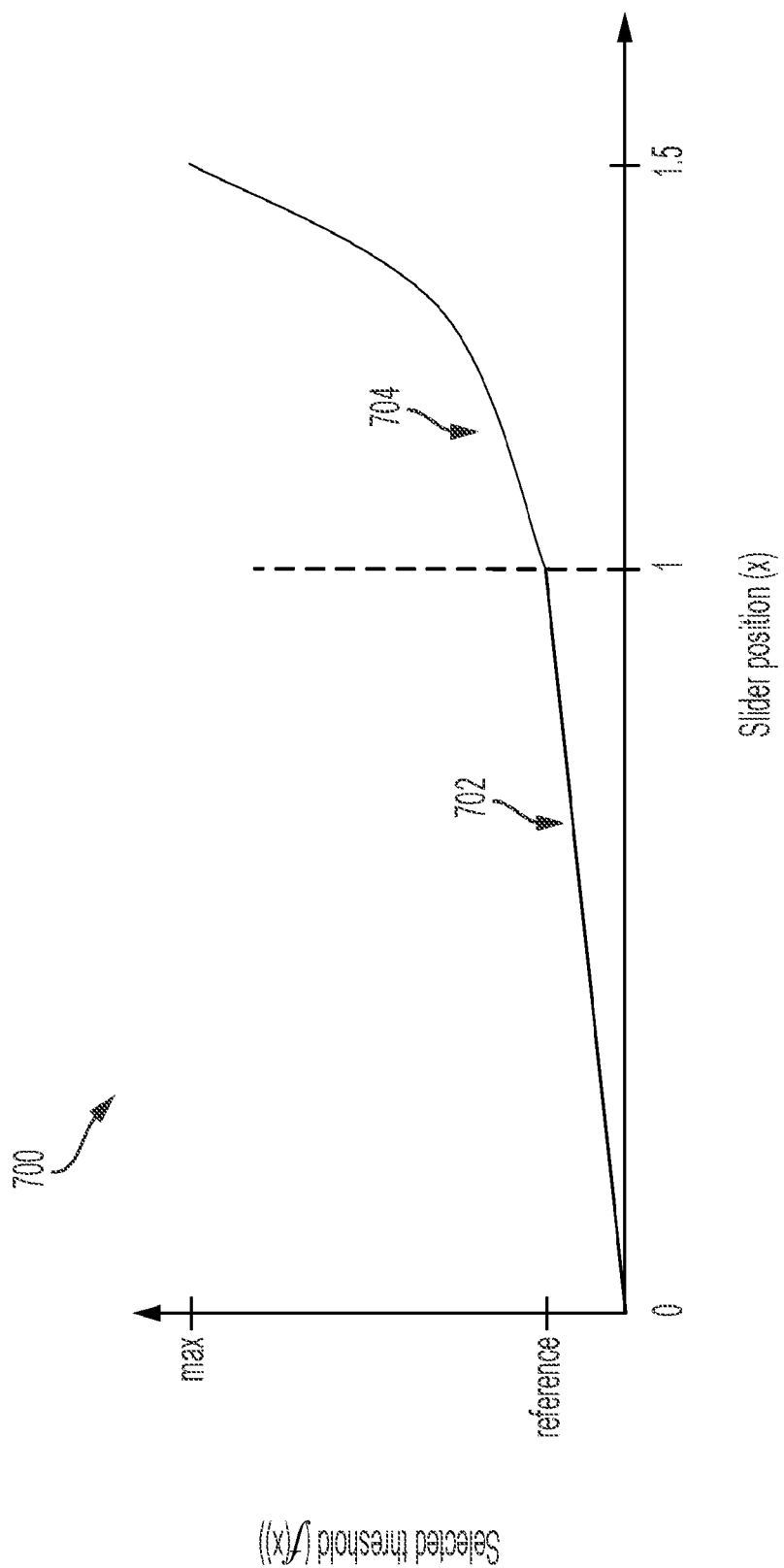
FIG. 7 is a graph showing a scaling function mapping user adjustable scale increments (slider position) to intensity window thresholds, according to an illustrative embodiment.

FIG. 7 shows a graph of the scaling function for typical values of r and m. As can be seen from the graph 700, the scaling function has a linear portion 702 from 0 to 1 (corresponding to intensity values from 0 to r) and a non-linear, quadratic, portion 704 from 1 to 1.5 (corresponding to intensity values ranging from r to m).

In certain embodiments, the maximum value, m, is less than 1.5r. In these cases a linear function can be used over the entire range from 0 to m (e.g., use of a nonlinear function is not required, and may introduce unexpected complexity to such simple cases).

D. Example 1: Improved Intensity Windowing for Image Review in a Cloud-Based Processing, Display, and Quality Control Workflow for Computing Bone Scan Index Values In certain embodiments, the graphical control and interactive intensity windowing approaches described herein facilitate review of automated analysis of bone scan images as part of a GUI-based automated analysis workflow, in order to determine indices that provide measures of disease state in a patient. Example 1 demonstrates use of the graphical control elements are used to facilitate an automated image review and reporting workflow as part of an image analysis and reporting workflow used in a cloud-based system for analyzing medical images and determining risk indices representative of disease state and/or progression in patients. In particular, the example shows software developed and incorporating the intensity windowing approaches described herein for calculation of automated bone scan index (aBSI) values from whole body bone scan images. BSI calculation is described in U.S. patent application Ser. No. 15/282,422, filed Sep. 30, 2016, and in U.S. Pat. No. 8,855,387, issued Oct. 7, 2014 (of which U.S. patent application Ser. No. 15/282,422 is a reissue), the contents of each of which are hereby incorporated by reference in their entirety. A cloud based platform that includes cloud-based BSI calculation is described in PCT Application No. PCT/US17/58418, filed Oct. 26, 2017, the content of which is hereby incorporated by reference in its entirety.

Figure 8A:
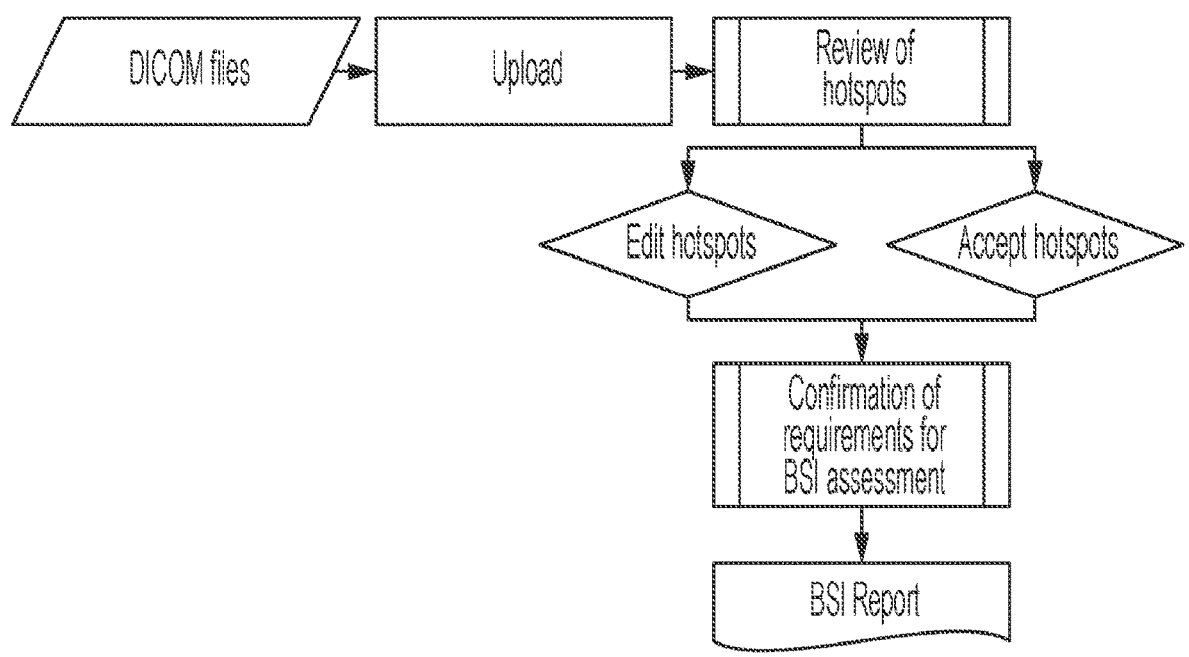
FIG. 8A is a block flow diagram showing a quality control and reporting workflow for generating a BSI report, according to an illustrative embodiment.

FIG. 8A is a block flow diagram showing a quality control and reporting workflow for generating a BSI report, according to an illustrative embodiment. In certain embodiments, the intensity window adjustment tools described herein are implemented as part of a GUI for guiding a user (e.g., healthcare professional) through review and analysis of patient image data to compute an automated BSI value and generate a report.

Figure 8B:
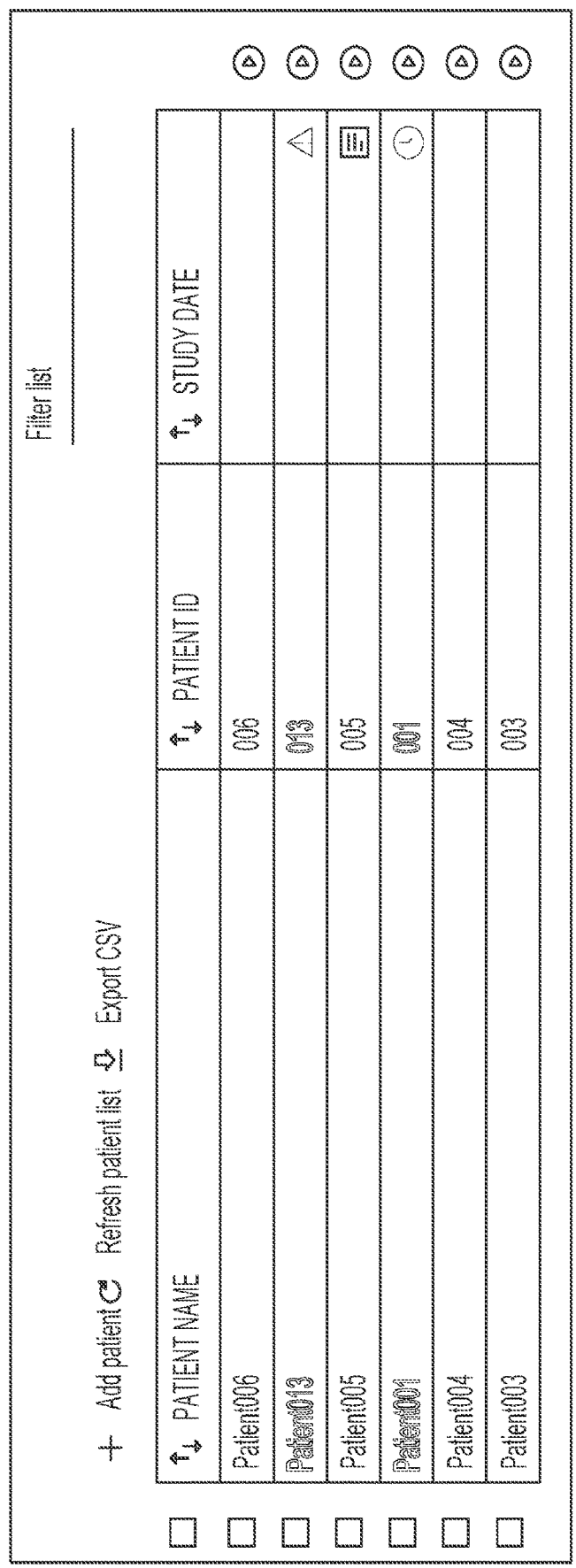
FIG. 8B is a screenshot of a graphical user interface (GUI) for selecting patient data for review, used with a software based implementation of the quality control and reporting workflow shown in FIG. 8A, according to an illustrative embodiment.
Figure 8C:
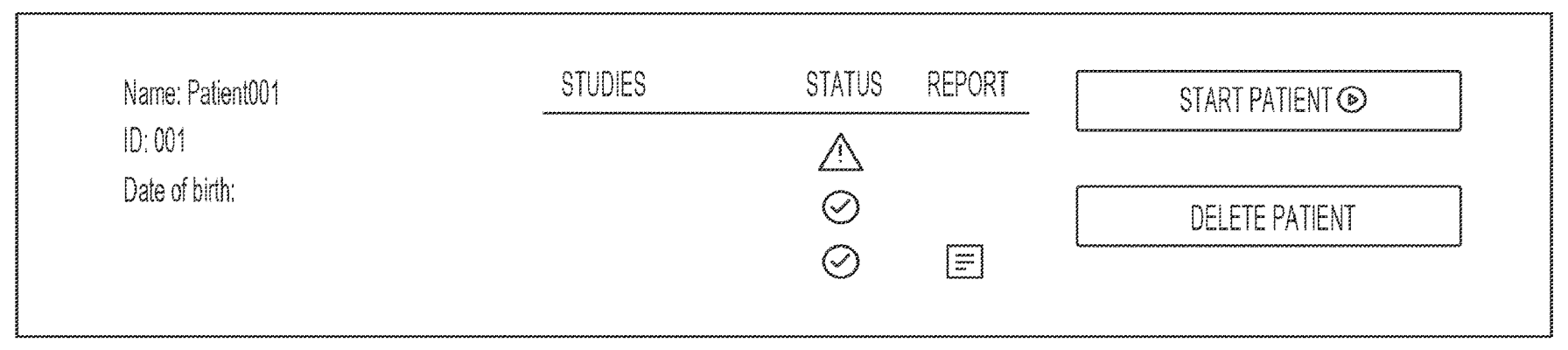

The user may be presented with a first GUI window, such as the window shown in FIG. 8B, that allows the user to select a particular patient for review/analysis from a list. Upon selection of a row corresponding to the particular patient in the list in FIG. 8B, a new and/or updated window, shown in FIG. 8C, showing patient information is displayed.

Figure 8D:
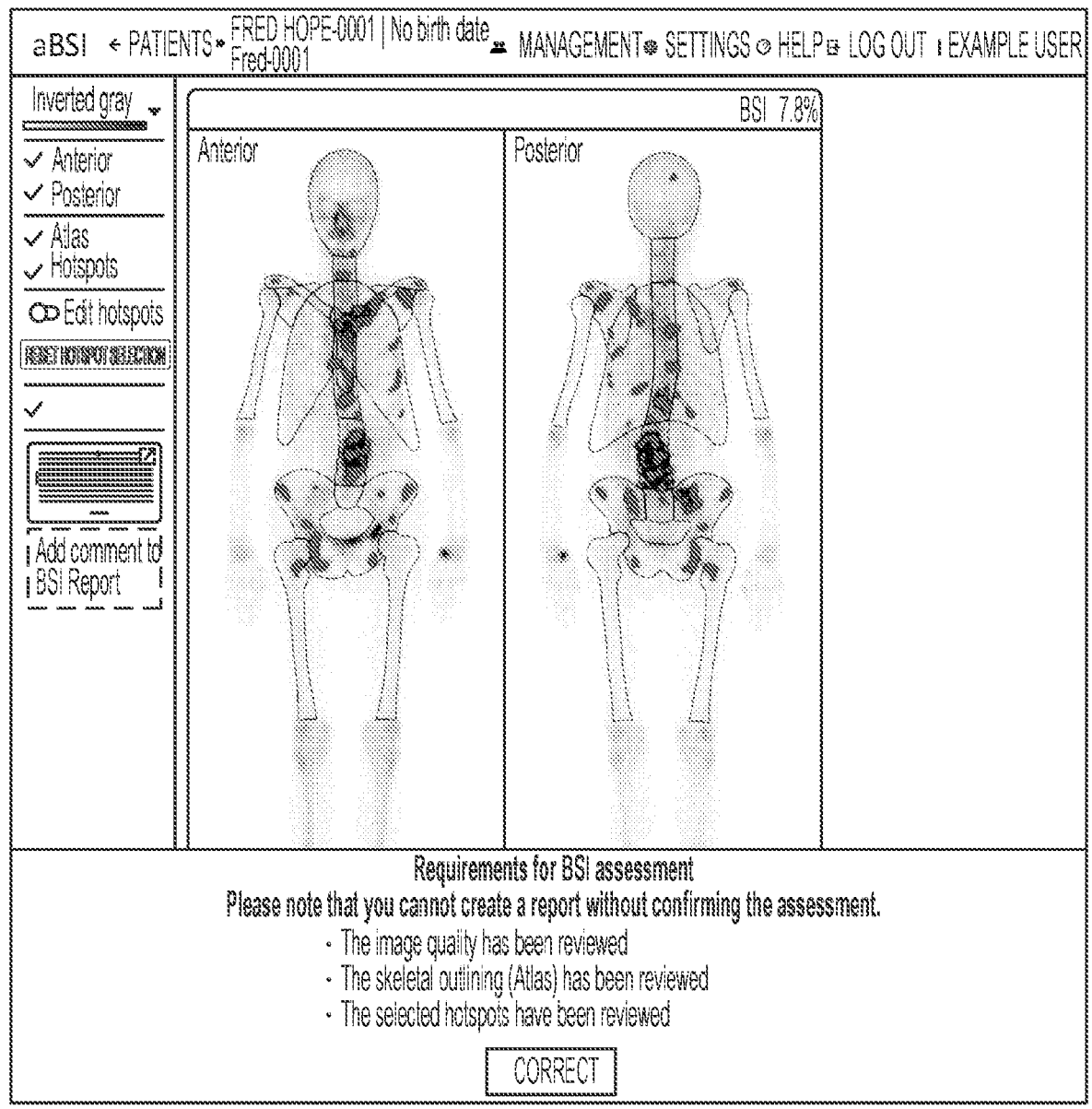
FIG. 8D is a screenshot of a graphical user interface (GUI) for reviewing image data for a patient and editing hotspot selection, used with a software based implementation of the quality control and reporting workflow shown in FIG. 8A, according to an illustrative embodiment.

Turning to FIG. 8D, the user may then access a review page of the guided analysis software The review page provides the user (e.g., healthcare professional, such as a physician) with a GUI that allows them examine image data and automated identification of hotspots performed by software backend, in order to calculate the automated BSI index for the patient. As noted above, automated BSI calculation technology is described in detail in U.S. patent application Ser. No. 15/282,422, filed Sep. 30, 2016, and in U.S. Pat. No. 8,855,387, issued Oct. 7, 2014 (of which U.S. patent application Ser. No. 15/282,422 is a reissue), and PCT Application No. PCT/US17/58418, filed Oct. 26, 2017, the contents of each of which are hereby incorporated by reference in their entirety.

Figure 8E:
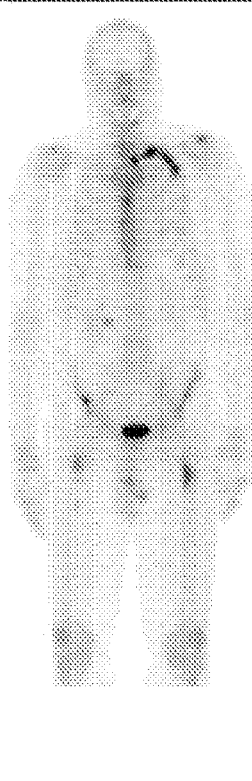
FIG. 8E is a screenshot of a graphical user interface (GUI) is a screenshot of an automatically generated report, generated by a user following the software based implementation of the quality control and reporting workflow shown in FIG. 8A, according to an illustrative embodiment.

The user may use the review page GUI to edit the set of regions identified as hotspots, and must confirm that image quality, skeletal segmentation (as depicted by the outlining in the screenshot), and that the set of identified hotspots have been reviewed in order to proceed with report generation. Once the user's review and quality control have been confirmed, a report such as the report shown in FIG. 8E, including a final BSI computed value, may be generated.

Figure 9A:
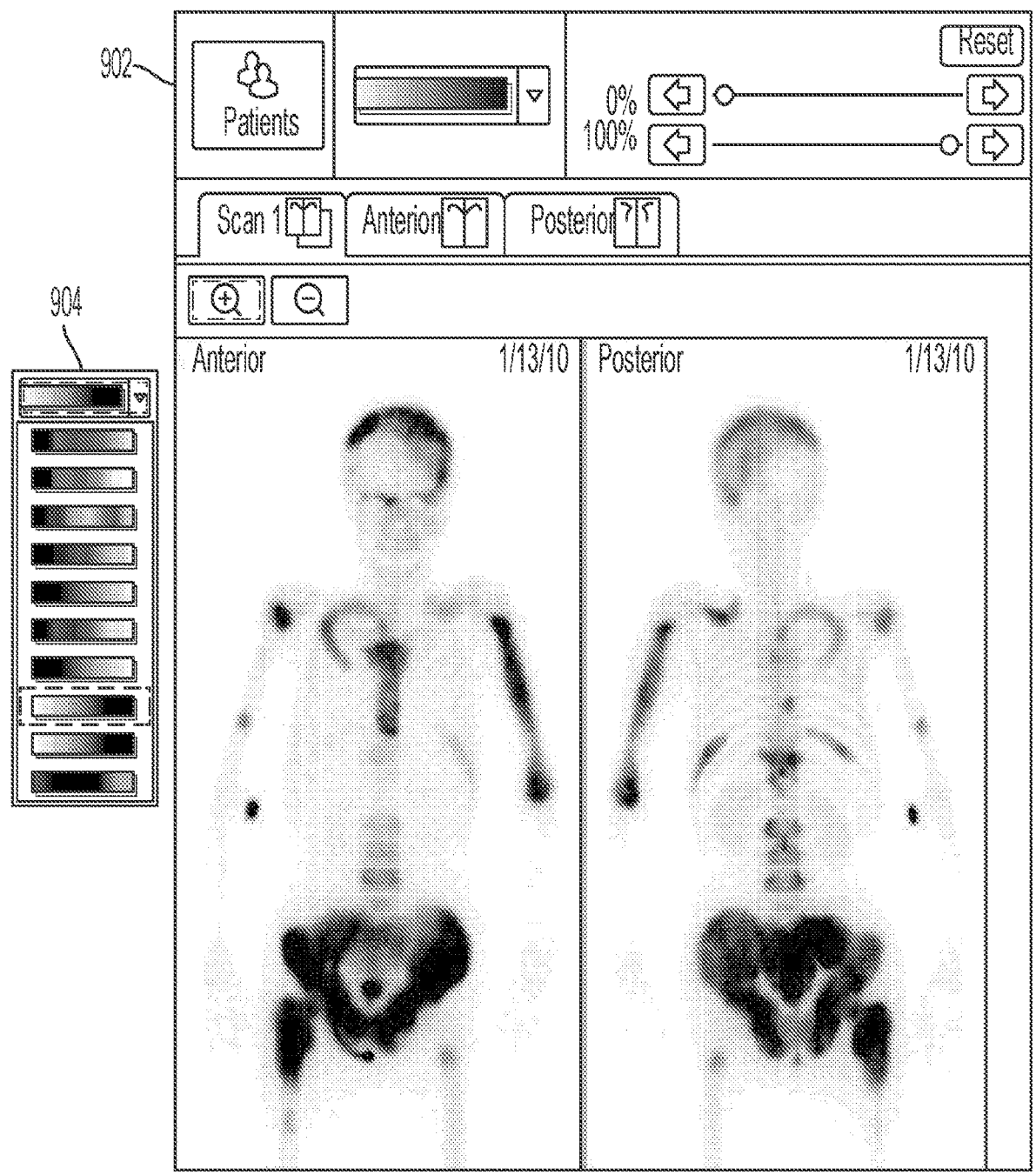
FIG. 9A is a screenshot of a GUI window displaying bone scan images, using an intensity window that only covers a limited range of intensity values.
Figure 9B:
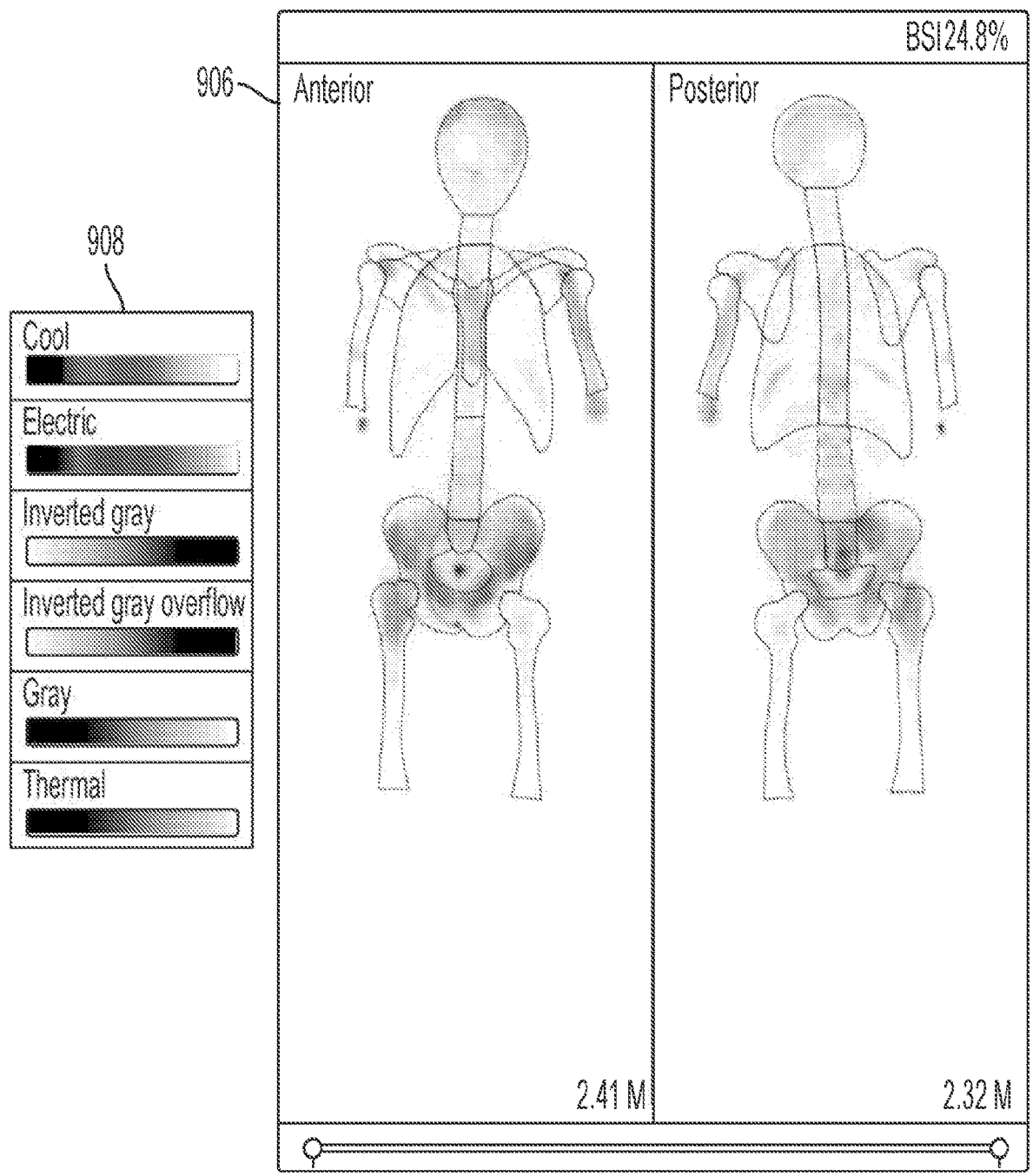
FIG. 9B is a screenshot of a GUI window displaying bone scan images using an intensity window that ranges up to a maximum intensity value, according to an illustrative embodiment.
Figure 9C:
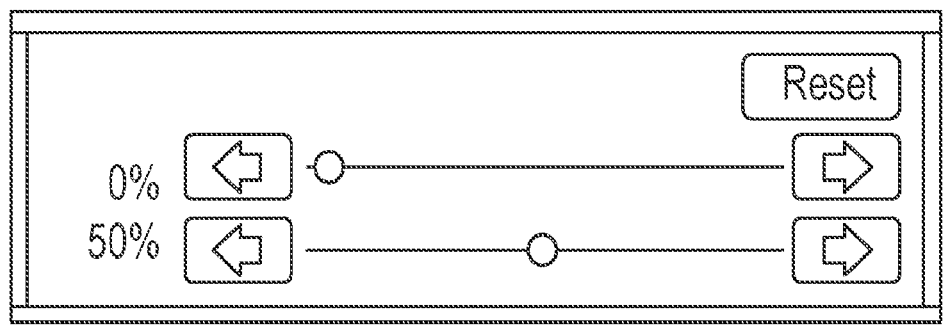
FIG. 9C is a screenshot of a portion of the GUI in FIG. 9A, showing a graphical control for adjustment of intensity window thresholds.
Figure 9D:
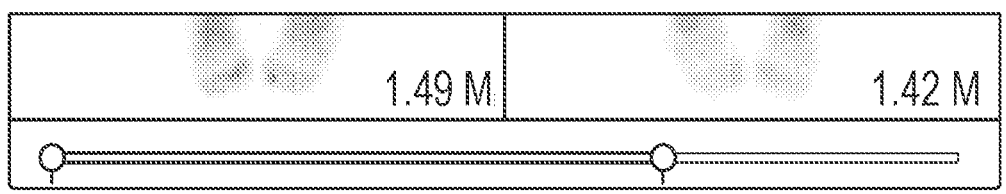
FIG. 9D is a screenshot of a portion of the GUI in FIG. 9B, showing another graphical control for adjustment of intensity window thresholds.

The intensity window adjustment graphical controls described herein are incorporated into the review page GUI, and allow the user to adjust the intensity window used to render and display the bone scan images. FIGS. 9A-D demonstrate the marked improvement in image presentation offered by the technology described herein over previous approaches. FIG. 9A shows images 902 rendered and displayed using a previous software version, which implemented the conventional linear slider with limited range—slider 602 in FIG. 6. Even with the slider indicator widgets set to the far ends of the scale, the maximum threshold is too low, and the pelvic region of the patient is clearly saturated. In contrast, FIG. 9B shows the new, custom slider described herein (e.g., slider 606 in FIG. 6) can be used to increase intensity window thresholds above the reference value, all the way to the maximum intensity value encountered in an image. The rendered and displayed images 906 are not saturated, and the user can readily explore the high intensity fluctuations in the pelvic region of the patient. While the images are shown using an inverted grayscale, other colorization schemes (commonly referred to as colormaps) are possible, with window 904 showing an earlier version of a set of colormap options and window 908 showing an updated set of colormap options. FIGS. 9C and 9D show different implementations of graphical control elements for adjustment of the indicator widgets to select intensity window thresholds. The slider shown in FIGS. 9B, and 9D is one user friendly, elegant graphical control, but variations and other types of controls are possible (e.g., controls using multiple sliders such as the version shown in FIG. 9C, as well as other controls, such as circular dials, various skeuomorphic controls, etc.).

Figure 9E:
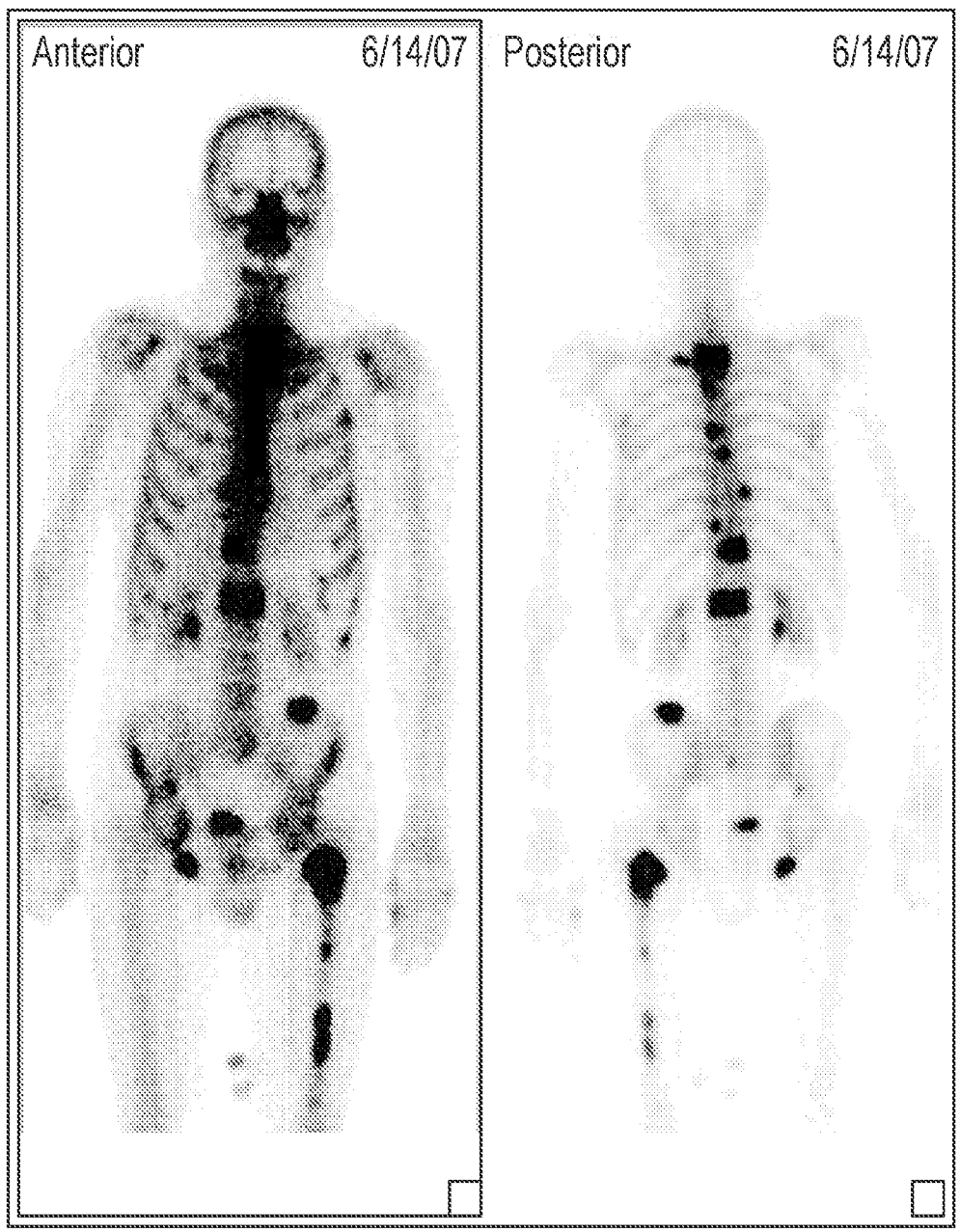
FIG. 9E is a screenshot of a GUI displaying anterior and posterior images of a bone scan image set, with each image displayed using a separate intensity window.
Figure 9F:
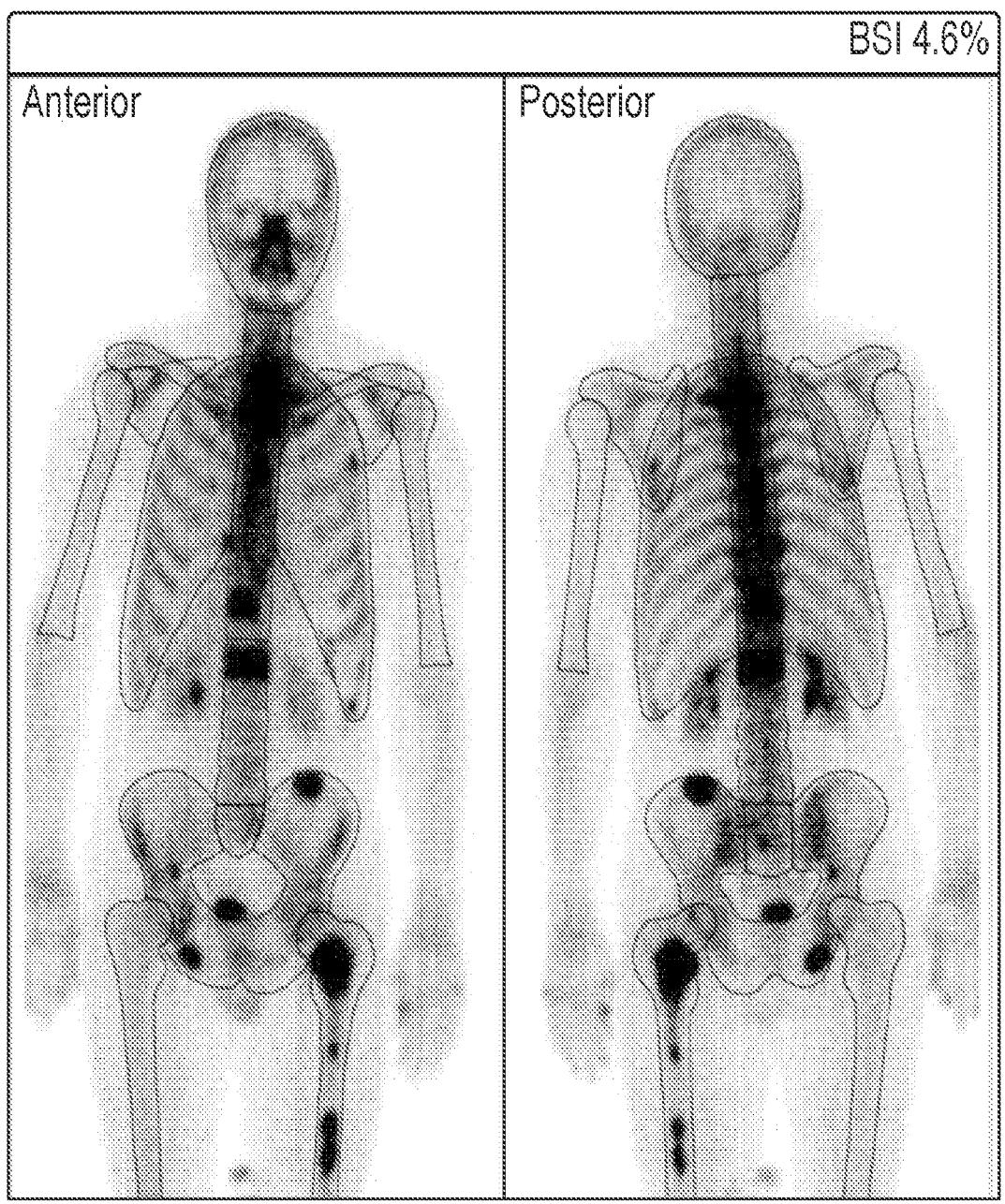
FIG. 9F is a screenshot of a GUI displaying anterior and posterior images of a bone scan image set, wherein a same intensity window is used for both images.

Turning to FIGS. 9E and 9F, once a subsequent intensity window is selected, it may be used for rendering a single image, or simultaneously for multiple images. For example, bone scan images are typically collected in sets comprising an anterior and a posterior bone scan image. Accordingly, a single intensity window may be used for rendering and display of both the anterior and posterior images in a bone scan image set. FIG. 9E shows anterior and posterior images rendered and displayed using different intensity windows, while FIG. 9F shows anterior and posterior images rendered and displayed using a same intensity window.

E. Computer System and Network Environment

Figure 10:
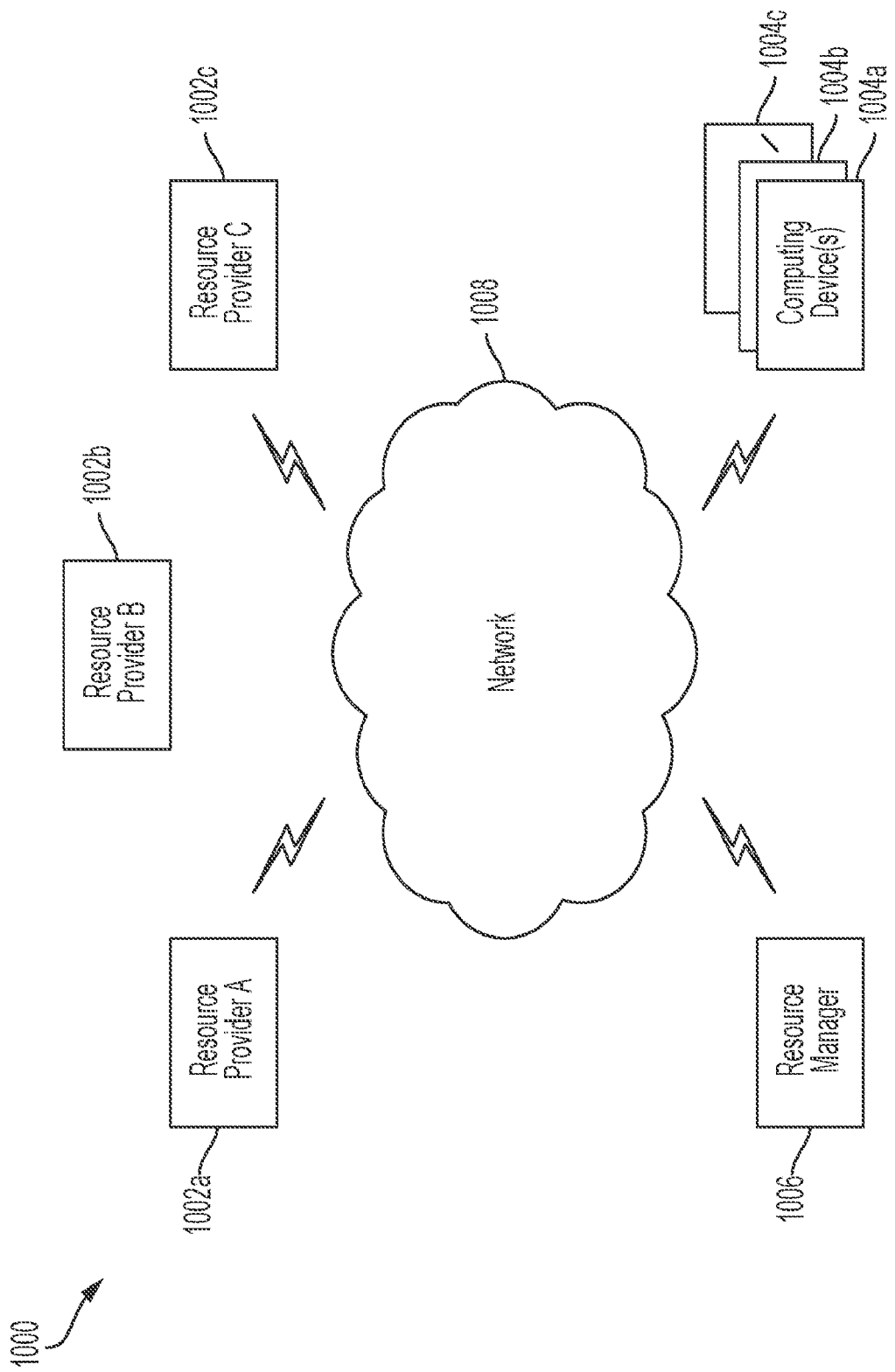
FIG. 10 is a block diagram of an exemplary cloud computing environment, used in certain embodiments.

FIG. 10 shows an illustrative network environment 1000 for use in the methods and systems described herein. In brief overview, referring now to FIG. 10, a block diagram of an exemplary cloud computing environment 1000 is shown and described. The cloud computing environment 1000 may include one or more resource providers 1002a, 1002b, 1002c (collectively, 1002). Each resource provider 1002 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1002 may be connected to any other resource provider 1002 in the cloud computing environment 1000. In some implementations, the resource providers 1002 may be connected over a computer network 1008. Each resource provider 1002 may be connected to one or more computing device 1004a, 1004b, 1004c (collectively, 1004), over the computer network 1008.

The cloud computing environment 1000 may include a resource manager 1006. The resource manager 1006 may be connected to the resource providers 1002 and the computing devices 1004 over the computer network 1008. In some implementations, the resource manager 1006 may facilitate the provision of computing resources by one or more resource providers 1002 to one or more computing devices 1004. The resource manager 1006 may receive a request for a computing resource from a particular computing device 1004. The resource manager 1006 may identify one or more resource providers 1002 capable of providing the computing resource requested by the computing device 1004. The resource manager 1006 may select a resource provider 1002 to provide the computing resource. The resource manager 1006 may facilitate a connection between the resource provider 1002 and a particular computing device 1004. In some implementations, the resource manager 1006 may establish a connection between a particular resource provider 1002 and a particular computing device 1004. In some implementations, the resource manager 1006 may redirect a particular computing device 1004 to a particular resource provider 1002 with the requested computing resource.

Figure 11:
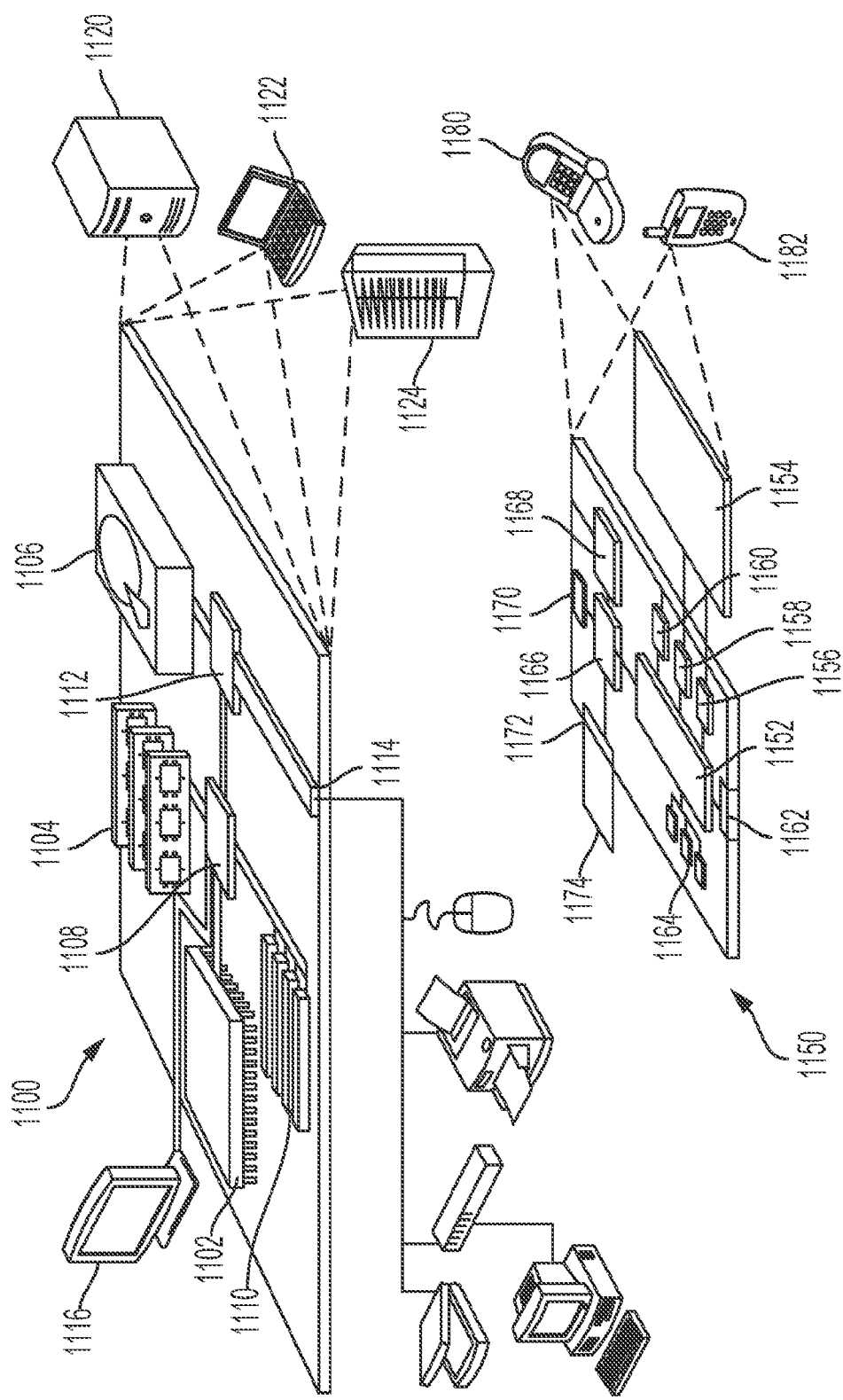
FIG. 11 is a block diagram of an example computing device and an example mobile computing device used in certain embodiments The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

FIG. 11 shows an example of a computing device 1100 and a mobile computing device 1150 that can be used in the methods and systems described in this disclosure. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102).

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provided as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth®, Wi-Fi™, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other. In some implementations, the modules and/or services described herein can be separated, combined or incorporated into single or combined modules and/or services. The modules and/or services depicted in the figures are not intended to limit the systems described herein to the software architectures shown therein While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for interactive adjustment of intensity window thresholds for display of a nuclear medicine image, the method comprising:
    (a) accessing, by a processor of a computing device, the nuclear medicine image, said image comprising a plurality of pixels each having an intensity representing a level of a detected signal;
    (b) rendering, by the processor, the nuclear medicine image for graphical display according to an initial intensity window, said rendering comprising using a set of available colormap values to visually represent the pixel intensities such that the full range of available colormap values are allocated to a subset of the pixel intensities that range from a minimum threshold of the initial intensity window to a maximum threshold of the initial intensity window;
    (c) causing, by the processor, display of a graphical control element allowing for user selection of a subsequent intensity window, different from the initial intensity window, via user adjustment of one or more displayed indicator widgets from which one or more thresholds of the subsequent intensity window are determined, wherein the displayed indicator widgets are adjustable along a scale having increments that map to intensity values via a scaling function, wherein, for at least a portion of the increments, the scaling function is nonlinear;

(d) receiving, by the processor a user selection of the subsequent intensity window corresponding to an adjusted position of the one or more displayed indicator widgets of the graphical control element;

(e) responsive to receipt of the user selection of the subsequent intensity window, rendering, by the processor, for graphical display, the nuclear medicine image according to the subsequent intensity window, said rendering comprising using the set of available colormap values to visually represent the pixel intensities such that the full range of available colormap values are allocated to a subset of the pixel intensities that range from a minimum threshold of the subsequent intensity window to a maximum threshold of the subsequent intensity window, thereby creating an updated rendering; and (f) causing, by the processor, display of the updated rendering from step (e), thereby dynamically updating display of the nuclear medicine image as the user adjusts selection the one or more displayed indicator widgets for selection of the subsequent intensity window.

2. The method of claim 1, comprising repeatedly performing steps (d)-(f) to update and display the nuclear medicine image in real-time, as the user adjusts the subsequent intensity window.

3. The method of claim 1, wherein the graphical control element comprises a visual representation of the scale as a path, with the displayed indicator widgets having adjustable positions along the path.

4. The method of claim 3, wherein the scale comprises a reference increment that maps to a reference intensity value and the graphical control element comprises a visual indication of the reference increment along the path.

5. The method of claim 1, wherein a minimum increment of the scale maps to a value of 0 intensity and a maximum increment of the scale maps to a maximum intensity value in the nuclear medicine image.

6. The method of claim 1, wherein the scale comprises a reference increment that maps to a reference intensity value, wherein the scaling function has a larger slope for intensity values above the reference intensity value than for intensity values below the reference increment.

7. The method of claim 6, wherein the scaling function is non-linear above the reference intensity value and linear below the reference intensity value.

8. The method of claim 4, comprising:
prior to step (b), normalizing, by the processor, the nuclear medicine image using a normalization factor, thereby producing a normalized version nuclear medicine image for rendering and display; and
computing, by the processor, the reference intensity value as a function of the normalization factor.

9. The method of claim 4, wherein the reference increment is located more than halfway along the scale from a minimum to a maximum end of the scale.

10. The method of claim 1, comprising, prior to step (b), normalizing, by the processor, the nuclear medicine image using a normalization factor, thereby producing a normalized version of the nuclear medicine image for rendering and display.

11. The method of claim 10, wherein the normalization factor is determined by identifying, by the processor, healthy tissue regions in the nuclear medicine image determined not to include any hotspots and calculating, by the processor, a normalization factor such that a product of the normalization factor and an average intensity of the identified healthy tissue regions is a pre-defined intensity level.

12. The method of claim 1, wherein the nuclear medicine image is a bone scan image.

13. A system for interactive adjustment of intensity window thresholds for display of a nuclear medicine image, the system comprising:
a processor of a computing device; and
a memory having instructions stored thereon, wherein the instructions, when executed by the processor, cause the processor to:
(a) access the nuclear medicine image, said image comprising a plurality of pixels each having an intensity representing a level of a detected signal;
(b) render, for graphical display, the nuclear medicine image according to an initial intensity window using a set of available colormap values to visually represent the pixel intensities such that the full range of available colormap values are allocated to a subset of the pixel intensities that range from a minimum threshold of the initial intensity window to a maximum threshold of the initial intensity window;
(c) cause display of a graphical control element allowing for user selection of a subsequent intensity window, different from the initial intensity window, via user adjustment of one or more displayed indicator widgets from which one or more thresholds of the subsequent intensity window are determined, wherein the displayed indicator widgets are adjustable along a scale having increments that map to intensity values via a scaling function, wherein, for at least a portion of the increments, the scaling function is nonlinear;
(d) receive a user selection of the subsequent intensity window corresponding to an adjusted position of the one or more displayed indicator widgets of the graphical control element;
(e) responsive to receipt of the subsequent intensity window, render, for graphical display, the nuclear medicine image according to the subsequent intensity window using the set of available colormap values to visually represent the pixel intensities such that the full range of available colormap values are allocated to a subset of the pixel intensities that range from a minimum threshold of the subsequent intensity window to a maximum threshold of the subsequent intensity window, thereby creating an updated rendering; and
(f) cause display of the updated rendering from step (e) thereby dynamically updating display of the nuclear medicine image as the user adjusts selection the one or more displayed indicator widgets for selection of the subsequent intensity window.

14. The system of claim 13, wherein the instructions cause the processor to repeatedly perform steps (d)-(f) to update and display the nuclear medicine image in real-time, as the user adjusts the subsequent intensity window.

15. The system of claim 13, wherein the graphical control element comprises a visual representation of the scale as a path, with the displayed indicator widgets having adjustable positions along the path.

16. The system of claim 15, wherein the scale comprises a reference increment that maps to a reference intensity value and the graphical control element comprises a visual indication of the reference increment along the path.

17. The system of claim 13, wherein a minimum increment of the scale maps to a value of 0 intensity and a maximum increment of the scale maps to a maximum intensity value in the nuclear medicine image.

18. The system of claim 13, wherein the scale comprises a reference increment that maps to a reference intensity value, wherein the scaling function has a larger slope for intensity values above the reference intensity value than for intensity values below the reference increment.

19. The system of claim 18, wherein the scaling function is non-linear above the reference intensity value and linear below the reference intensity value.

20. The system of claim 18, wherein the instructions cause the processor to:
prior to step (b), normalize the nuclear medicine image using a normalization factor, thereby producing a normalized version of the nuclear medicine image for rendering and display; and
compute the reference intensity value as a function of the normalization factor.

21. The system of claim 18, wherein the reference increment is located more than halfway along the scale from a minimum to a maximum end of the scale.

22. The system of claim 13, wherein the instructions cause the processor to, prior to step (b):
normalize the nuclear medicine image using a normalization factor, thereby producing a normalized version of the nuclear medicine image for rendering and display.

23. The system of claim 22, wherein the instructions cause the processor to determine the normalization factor by identifying healthy tissue regions in the nuclear medicine image determined not to include any hotspots and calculating the normalization factor such that a product of the normalization factor and an average intensity of the identified healthy tissue regions is a pre-defined intensity level.

24. The system of claim 13, wherein the nuclear medicine image is a bone scan image.

* * * * *